US009401059B2

(12) United States Patent
Backert et al.

(10) Patent No.: US 9,401,059 B2
(45) Date of Patent: Jul. 26, 2016

(54) SYSTEM AND METHOD FOR SECURE VOTING

(71) Applicants: Alisa Backert, Garden City, NJ (US); Christopher Charles Backert, Arlington, VA (US); Christopher Charles Dahl, Cambridge, MA (US)

(72) Inventors: Alisa Backert, Garden City, NJ (US); Christopher Charles Backert, Arlington, VA (US); Christopher Charles Dahl, Cambridge, MA (US)

(73) Assignee: E-GOVERNMENT CONSULTING GROUP, INC., Cambridge, MA (US)

( * ) Notice: Subject to any disclaimer, the term of this patent is extended or adjusted under 35 U.S.C. 154(b) by 0 days.

(21) Appl. No.: 14/165,272

(22) Filed: Jan. 27, 2014

(65) Prior Publication Data
US 2015/0310686 A1 Oct. 29, 2015

Related U.S. Application Data

(60) Continuation-in-part of application No. 13/618,355, filed on Sep. 14, 2012, now Pat. No. 8,636,211, which is a division of application No. 12/318,492, filed on Dec. 30, 2008, now Pat. No. 8,297,506.

(60) Provisional application No. 61/006,301, filed on Jan. 4, 2008.

(51) Int. Cl.
G06K 17/00 (2006.01)
G07C 13/00 (2006.01)
G06F 21/36 (2013.01)
(Continued)

(52) U.S. Cl.
CPC .............. *G07C 13/00* (2013.01); *G06F 21/36* (2013.01); *G06F 21/445* (2013.01); *G06F 21/606* (2013.01); *G06F 21/6263* (2013.01); *G06F 21/645* (2013.01); *G06Q 10/00* (2013.01); *G06Q 50/265* (2013.01); *H04L 9/3234* (2013.01); *H04L 9/3249* (2013.01); *H04L 63/126* (2013.01); *H04L 63/1466* (2013.01); *H04L 67/02* (2013.01); *H04L 2209/463* (2013.01); *H04L 2209/608* (2013.01)

(58) Field of Classification Search
CPC ..... G06F 21/36; G06F 21/445; G06F 21/606; G06F 21/6263; G06Q 10/00; G06Q 50/265; G07C 13/00; H04L 2209/463; H04L 2209/608; H04L 63/126; H04L 9/3234; H04L 9/3249
USPC ........ 235/386; 434/419; 704/E15, 49; 705/12
See application file for complete search history.

(56) References Cited

U.S. PATENT DOCUMENTS 7,640,181 B2 * 12/2009 McClure ................ G07C 13/00
                                                             705/12
2002/0019767 A1 * 2/2002 Babbitt .................. G07C 13/00
                                                             705/12

(Continued)

Primary Examiner — Seung Lee
(74) Attorney, Agent, or Firm — Finnegan, Henderson, Farabow, Garrett & Dunner LLP

(57) ABSTRACT

Methods, systems, and computer-readable media are provided for conducting an election. In one exemplary embodiment, there is provided a method for ensuring integrity of an electronic ballot. The method can include creating electronic ballots for voters based on votes received from the voters; digitally signing the electronic ballots; storing the signed electronic ballots; retrieving the signed electronic ballots from storage; verifying the digital signatures on the retrieved electronic ballots; and presenting the voters with validation pages derived from the retrieved electronic ballots, the validation pages including a user interface element for the voters to confirm that the retrieved electronic ballots accurately reflect their vote.

18 Claims, 14 Drawing Sheets

(51) Int. Cl.
*G06F 21/44* (2013.01)
*H04L 29/08* (2006.01)
*H04L 29/06* (2006.01)
*G06F 21/60* (2013.01)
*G06F 21/62* (2013.01)
*G06Q 10/00* (2012.01)
*H04L 9/32* (2006.01)
*G06Q 50/26* (2012.01)
*G06F 21/64* (2013.01)

(56) References Cited

U.S. PATENT DOCUMENTS

2005/0161507 A1\* 7/2005 Openshaw ............ G07C 13/00
　　　　　　　　　　　　　　　　　　　　　　235/386
2008/0256119 A1\* 10/2008 Barzel et al. ................. 707/102

\* cited by examiner

| | GUID | Voting Terminal | DB Key | Media File | Election Element | Credential |
|---|---|---|---|---|---|---|
| 402-1 | 6585 | 101-1 | Bigtown_election_key | Bigtown_election_img 501 | BIGTOWN_ELECTION_2008 | 3518C |
| 403-1 | 1648 | 101-1 | Bigtown_mayor_race_key | Bigtown_mayor_race_img 502 | BIGTOWN_MAYOR_RACE | 3518C |
| | 9898 | 101-1 | Bigtown_sherriff_race_key | Bigtown_sherriff_race_img | BIGTOWN_SHERRIFF_RACE | 3518C |
| | 4185 | 101-1 | | | VOTING_SESSION | 3518C |
| 401-A1 | 4572 | 101-1 | candidate_key_A | Candidate A photo 501A | Candidate_A | 3518C |
| 401-B1 | 7897 | 101-1 | candidate_key_B | Candidate B photo 501B | Candidate_B | 3518C |
| 402-2 | 1794 | 101-2 | Bigtown_election_key | Bigtown_election_img 501 | BIGTOWN_ELECTION_2008 | 7832R |
| 403-2 | 3590 | 101-2 | Bigtown_mayor_race_key | Bigtown_mayor_race_img 502 | BIGTOWN_MAYOR_RACE | 7832R |
| | 0912 | 101-2 | Bigtown_sherriff_race_key | Bigtown_sherriff_race_img | BIGTOWN_SHERRIFF_RACE | 7832R |
| | 0812 | 101-2 | | | VOTING_SESSION | 7832R |
| 401-A2 | 1024 | 101-2 | candidate_key_A | Candidate A photo 501A | Candidate A | 7832R |
| 401-B2 | 5517 | 101-2 | candidate_key_B | Candidate B photo 501B | Candidate B | 7832R |

| | | |
|---|---|---|
| 701-1 | Race | Mayor of Bigtown, 2008 | 751-1 |
| 702-1 | Selected election element | Candidate_key_A | 752-1 |
| 703-1 | Encryption algorithm identifier | AES | 753-1 |
| 704-1 | Key bit length | 128 | 754-1 |
| 705-1 | Encryption Key | 0x323c6c505a | 755-1 |
| 706-1 | Initialization vector | VECTOR_1 | 756-1 |
| 707-1 | Hash method identifier | SHA_1 | 757-1 |
| 708-1 | Certificate serial number | xFF12994C | 758-1 |
| 709-1 | Digital Signature | 0xa9893e384706816aba3e25717850c26c9cd0d89d | 759-1 |

| | | |
|---|---|---|
| 701-2 | Race | Mayor of Bigtown | 751-2 |
| 702-2 | Selected election element | Candidate_key_B | 752-2 |
| 703-2 | Encryption algorithm identifier | AES | 753-2 |
| 704-2 | Key bit length | 128 | 754-2 |
| 705-2 | Encryption Key | 0x429bbc9111 | 755-2 |
| 706-2 | Initialization vector | VECTOR_1 | 756-2 |
| 707-2 | Hash method identifier | SHA_1 | 757-2 |
| 708-2 | Certificate serial number | xFF12994C | 758-2 |
| 709-2 | Digital Signature | 0xbcef7a0482580829937590bade995b3ae8bee26c7 | 759-2 |

FIG. 7B

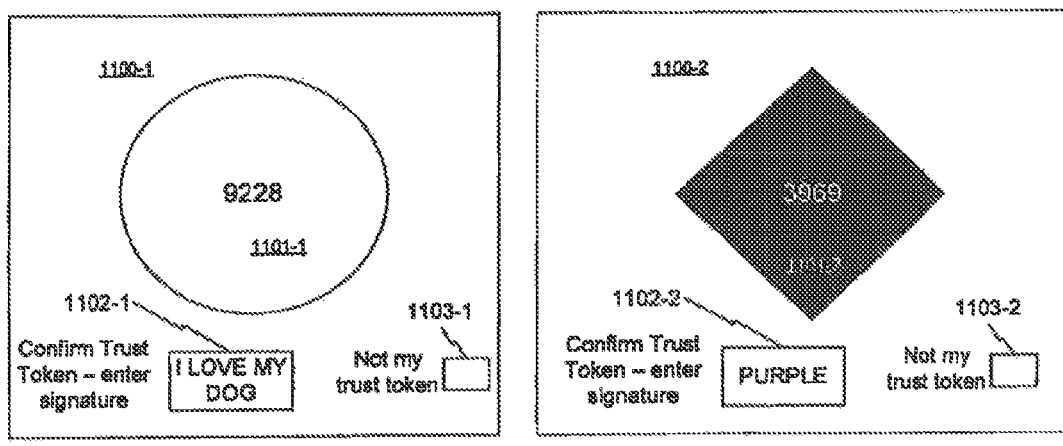
FIG. 11A
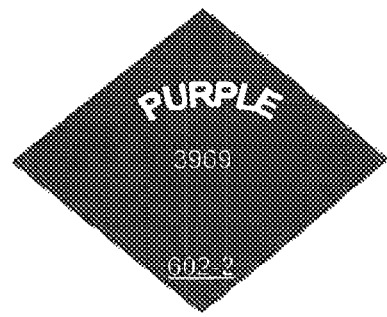
FIG. 11B
FIG. 11C

SYSTEM AND METHOD FOR SECURE VOTING

RELATED APPLICATIONS

This application is a continuation-in-part of pending U.S. patent application Ser. No. 13/618,355, filed Sep. 14, 2012 (now allowed), which is a divisional of and claims the benefit of priority to U.S. patent application Ser. No. 12/318,492, filed Dec. 30, 2008 (now U.S. Pat. No. 8,297,506), which is based upon and claims the benefit of priority from U.S. Provisional Patent Application No. 61/006,301, filed Jan. 4, 2008. The contents of the above-referenced application are expressly incorporated by reference to their entireties.

I. BACKGROUND

1. Technical Field

The present invention generally relates to computer security and, more particularly, for methods of implementing secure elections using networked computers.

2. Background Information

Computers can be used in a variety of different ways to conduct an election. For example, computers can be used to read punch cards or other paper-based ballots, and computers can also be used directly at a polling site where voters cast their vote using a computer. Computers placed at a polling site can store the votes locally, or they can transmit votes electronically across a network to a computer at another location, where the votes can be subsequently stored and counted.

Using computers to conduct an election introduces a number of efficiencies into the process. For example, computers can be easier for disabled persons to use than traditional polling booths. Electronic ballots can be more accurate than paper ballots because computers can record votes with near-perfect accuracy, rather than having human beings trying to discern voter intent from a punchcard. Further, votes can be tabulated much more quickly by a computer than by human beings or mechanical devices.

On the other hand, computers are susceptible to certain vulnerabilities that cause some apprehension about their use in a process as critical as an election. For example, doubts can arise about the integrity of votes cast at a computer. Mechanisms must be in place to ensure that a vote counted in an election was indeed actually cast by a voter and not manipulated by an attacker. Even assuming no one intentionally interferes with the integrity of an election, voters may have doubts that their electronic votes were accurately recorded. These voters may fear that their votes were inadvertently counted for the wrong election choice.

Using networked, rather than stand-alone, computers to conduct an election can introduce even further efficiencies into the election process. By centralizing certain processing at a server and using distributed voting terminals to communicate votes to the central server over a network, it is possible to reduce the potential for fraud. For example, by using one central server to store votes in a physically secure environment, the server may be more trustworthy than a number of dispersed voting terminals that have been handled by a number of different individuals.

However, transmitting data across any network generally leads to some security concerns. In the case of an election, a computer masquerading as a legitimate voting terminal could be used to cast any number of fraudulent votes. Further, a computer with access to the network could conduct a "snooping" attack and monitor a voter's choices in a given election. An attacker could also conduct a "spoofing" attack by presenting a web page on a voting terminal that makes the attacker's computer appear to be a central voting server.

Given the privacy concerns and potential for fraud discussed above, it is desirable to provide a comprehensive system for implementing secure elections using computers. It is further desirable to allow voters in an online election using a central server to accurately identify communications from the server as coming from the server and not a spoofing attacker. It is further desirable to allow voters to transmit network traffic that identifies the voters' choices to the server, while preventing an attacker on the network from being able to discern the choices.

II. SUMMARY

Consistent with the invention, there is provided methods and apparatus for ensuring the integrity of an electronic ballot, the method comprising the steps of creating electronic ballots for voters based on votes received from the voters; digitally signing the electronic ballots; storing the signed electronic ballots; retrieving the signed electronic ballots from storage; verifying the digital signatures on the retrieved electronic ballots; and presenting the voters with validation pages to confirm their votes, the validation pages being based on the retrieved electronic ballots.

Consistent with the invention, there is also provided methods and apparatus for identifying an election server to a voter over a network, the method comprising the steps of requesting a credential from the voter, the credential having been provided to the voter with verification data unique to the voter using a secure channel, presenting the verification data to the voter if the voter supplies the credential in response to the request, receiving, from the voter, acknowledgement data unique to the voter, altering the verification data using the acknowledgement data received from the voter, and identifying the election server to the voter by presenting the altered verification data to the voter over the network.

Consistent with the invention, there is also provided methods and apparatus for obscuring selections of voters in an on-line election, the method comprising the steps of storing media files representing election elements available to the voters, the election elements including a first election element and the media files including a media file representing the first election element, generating a plurality of unique first election element identifiers for use by the voters to select the first election element, assigning the first election element identifiers to the voters, sending the voters their respective assigned first election element identifiers and the media file representing the first election element, receiving an element identifier from a first one of the voters, and determining that the first voter has selected the first election element if the received element identifier matches the assigned first election element identifier sent to the first voter.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

III. BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings, FIG. 1 is a block diagram of an exemplary election system consistent with certain aspects related to the present invention.

FIG. 4 illustrates an exemplary data structure consistent with certain aspects related to the present invention.

FIG. 7A is a block diagram of an exemplary voted electronic ballot consistent with certain aspects related to the present invention.

FIG. 7B is a block diagram of an exemplary voted electronic ballot consistent with certain aspects related to the present invention.

FIG. 11A is a block diagram of exemplary trust token verification windows consistent with certain aspects related to the present invention.

FIG. 11B is a block diagram of exemplary trust token files consistent with certain aspects related to the present invention.

FIG. 11C is block diagram of exemplary signed trust tokens consistent with certain aspects related to the present invention.

IV. DETAILED DESCRIPTION

Reference will now be made in detail to the exemplary embodiments consistent with the invention, examples of which are illustrated in the accompanying drawings. Wherever possible, the same reference numbers will be used throughout the drawings to refer to the same or like parts.

Figure 1:
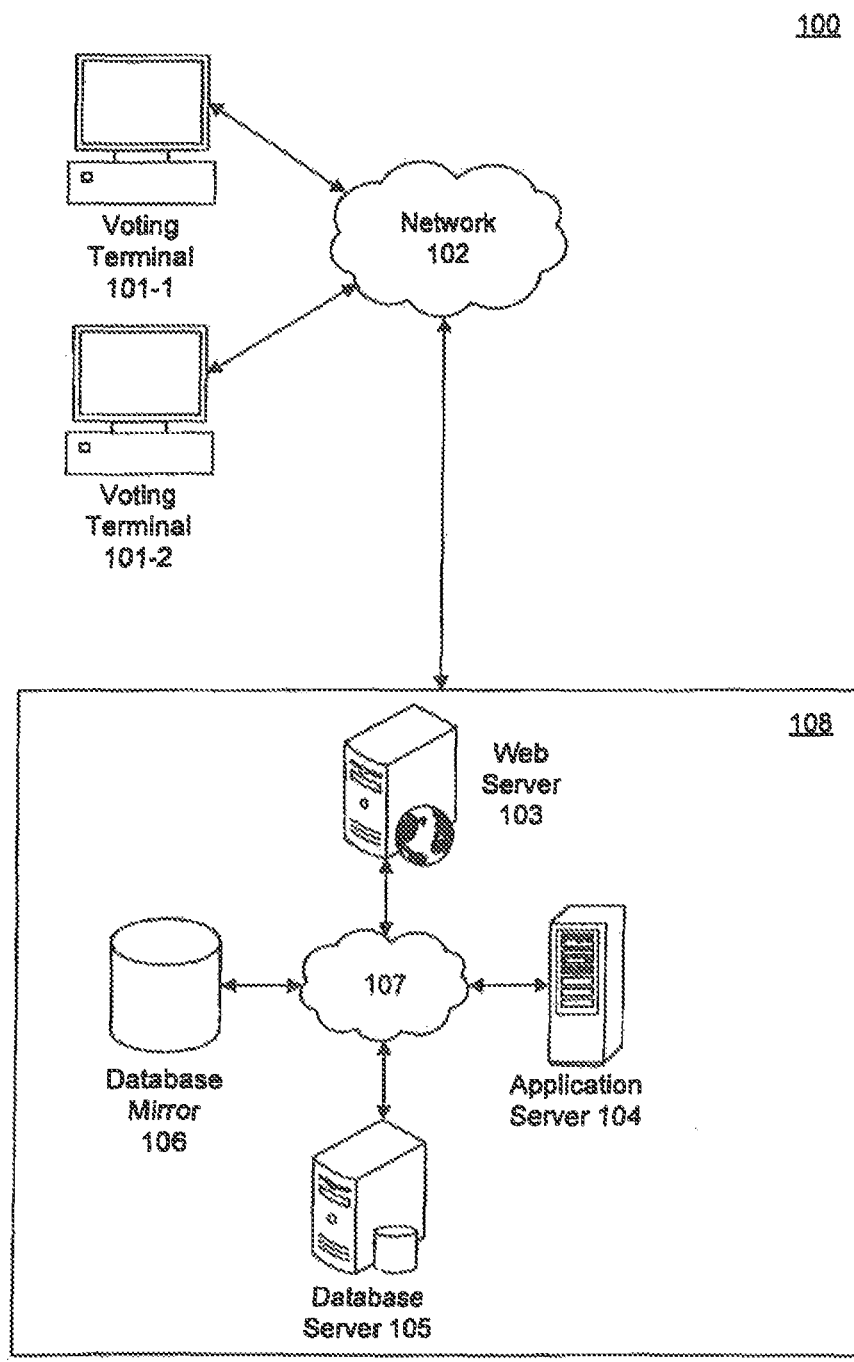

FIG. 1 is a block diagram of an exemplary election system 100. Election system 100 may include a voting terminal 101-1 for use by a first voter, a voting terminal 101-2 for use by a second voter, a network 102, a web server 103, an application server 104, a database server 105, a database mirror server 106, and a network 107. Collectively, web server 103, application server 104, database server 105, database mirror server 106, and network 107 comprise a central election site 108. Networks 102 and 107 may each be any combination of wired or wireless computer networks. Networks 102 and 107 can be virtually any type of network, including a WAN such as the Internet, or a home- or office-based LAN. In one embodiment, network 102 is the Internet, and network 107 is a virtual private network (VPN) connecting the various servers in central election site 108. Of course, many more terminals 101-3 to 101-n may be included in system 100.

Voting terminals 101-1 and 101-2, web server 103, application server 104, database server 105, and database mirror 106 may be any suitable type of computer device such as a desktop or laptop computer, a commercial server, or a handheld device. Voting terminal 101-1 and 101-2, web server 103, application server 104, database server 105, and database mirror 106 may include one or more processors, as well as storage devices such as RAM, ROM, hard drives, CD/DVD, or flash drives. Methods consistent with the invention may be tangibly embodied on these storage devices as instructions for execution by the one or more processors. Voting terminals 101-1 and 101-2, web server 103, application server 104, database server 105, and database mirror 106 may also include various peripherals such as monitors, printers, keyboards, mice, and other devices.

Each of the components of system 100 shown in FIG. 1 represents a physical implementation of a logical component of system 100. However, the systems and methods disclosed herein can be embodied in many different combinations of hardware and software. Further, the systems and methods disclosed herein can be embodied in a geographically centralized or distributed manner.

Communication network 102 allows voting terminals 101-1 and 101-2 to communicate with the various servers in central election site 108, in particular application server 104. In one embodiment, communications from voting terminals 101 are sent to web server 103 using SSL (secure sockets layer) or TSL (transport layer security) protocol. Web server 103 then routes these communications across network 107 to application server 104.

For the sake of brevity and clarity, the discussion below centers on two voters, namely a first voter operating voting terminal 101-1, and a second voter operating voting terminal 101-2. However, in actual use, any number of voters may operate any number of voting terminals to participate in the election. In some embodiments, more than one voter will use a single voting terminal. The voters at voting terminals 101-1 and 101-2 can be distinguished by using credentials supplied to voters before the election.

Also for brevity and clarity, the discussion below relates to an election in a single town, "Bigtown," in the year 2008. The election is for the Mayor of Bigtown, and two candidates are on the ballot for Mayor. The disclosed embodiment can also be used in elections with multiple candidates, multiple jurisdictions, and with ballot choices other than human candidates, such as referenda or initiatives.

Application server 104 can implement various processes to conduct an election, such as sending election data to voting terminals 101-1 and 101-2, and receiving data such as votes from voting terminals 101-1 and 101-2, through web server 103. Application server 104 can store votes on database server 105. Database mirror server 106 can store identical data as that on database server 105, to serve as a backup in case of malfunction. In one embodiment, database mirror server 106 is present in a different location than database server 105, to further mitigate the risk of data loss. Database mirror server 106 can use available replication techniques, such as mirroring and clustering, to provide a backup of database server 105.

Figure 2A:
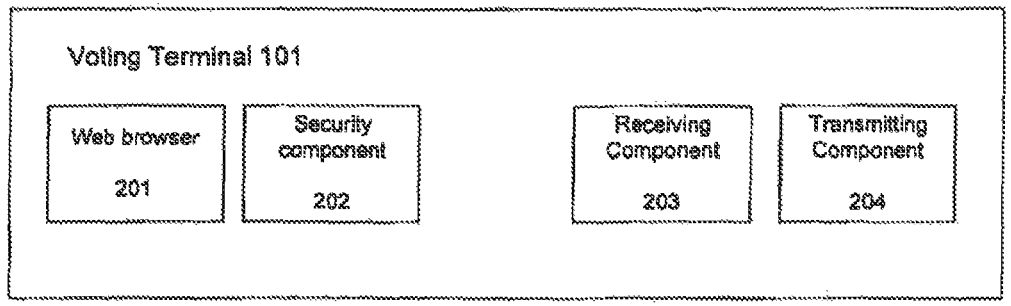
FIG. 2A is a block diagram of an exemplary voting terminal consistent with certain aspects related to the present invention.

FIG. 2A is a block diagram of an exemplary voting terminal 101. Voting terminals 101-1 and 101-2 share the architecture shown for voting terminal 101. Voting terminal 101 includes a web browser 201 for browsing web sites such as those available over the Internet. Voting terminal 101 also includes a security component 202 for encrypting communications to and from web browser 201. Security component 202 can provide secure sockets layer (SSL) or transport layer security (TSL) functionality to implement the secure communications for web browser 201. Thus, web browser 201 can use SSL or TSL to encrypt communications and securely communicate across an insecure network such as the Internet. In some embodiments, security component 202 will be integrated into web browser 201.

Voting terminal 101 also includes a receiving component 203 for receiving information over network 102, and a transmitting component 204 for transmitting information over network 102. Receiving component 203 may receive both encrypted communications for decryption by security component 202, and unencrypted communications. Similarly, transmitting component 204 may transmit both communications encrypted by security component 202, and unencrypted communications, over network 102.

Figure 2B:
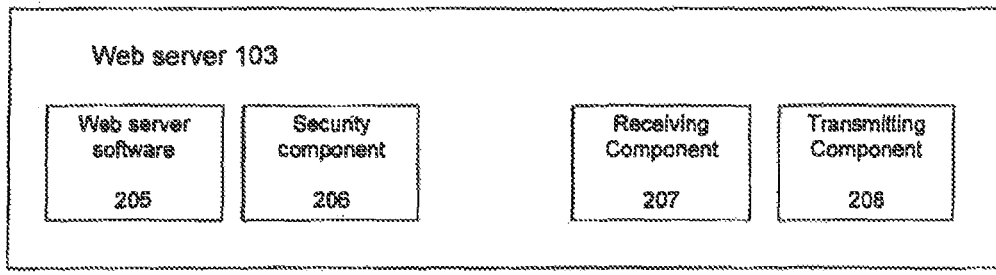
FIG. 2B is a block diagram of an exemplary web server consistent with certain aspects related to the present invention.

FIG. 2B is a block diagram of web server 103. Web server 103 includes web server software 205, such as Apache HTTP Server. Web server software 205 can be used to provide a web site to which voting terminals 101-1 and 101-2 may connect over network 102. Web server 103 also includes a security component 206. Security component 206 provides services similar to security component 202, such as providing secure sockets layer (SSL) or transport layer security (TSL) functionality to web server software 205. Thus, security component 206 allows web server software 205 to encrypt communications and securely communicate across insecure networks. In some embodiments, security component 206 will be integrated into web server software 205.

Web server 103 also includes a receiving component 207 and a transmitting component 208. Receiving component 207 and transmitting component 208 function similarly to receiving component 203 and transmitting component 204 of voting terminal 101, respectively, including using security component 206 to communicate with voting terminals 101-1 and 101-2 and application server 104.

Figure 2C:
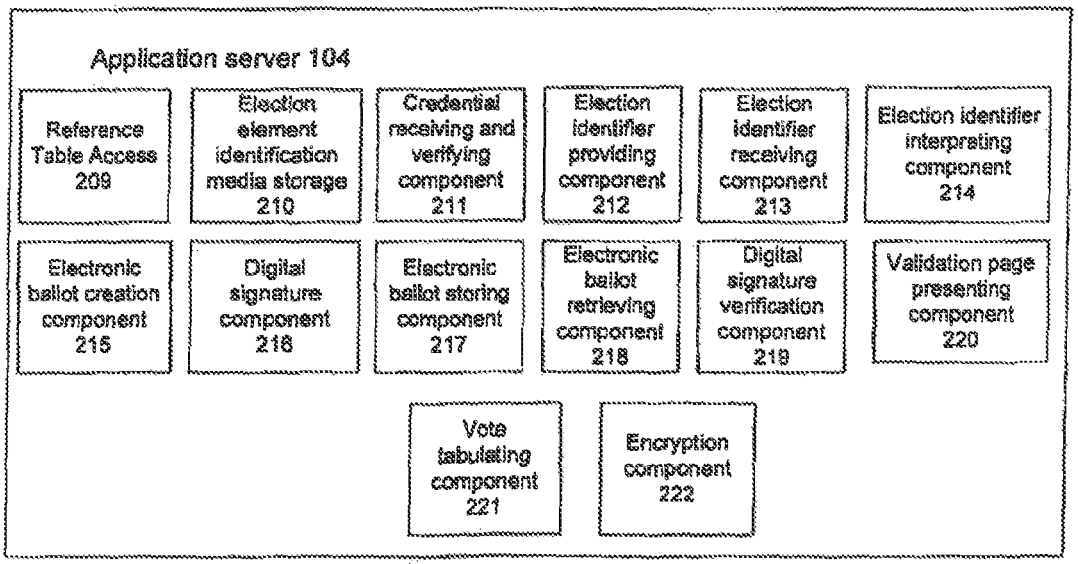
FIG. 2C is a block diagram of an exemplary application server consistent with certain aspects related to the present invention.

FIG. 2C is a block diagram of application server 104. Application server 104 includes a reference table access component 209 for correlating identifiers to candidates or other election choices, as detailed below. Application server 104 also includes election element identification media storage 210, for storing files such as pictures of candidates, or audio or video files that can be used to identify election candidates or other choices available to voters.

Application server 104 also includes a credential receiving and verifying component 211, an election identifier providing component 212, an election identifier receiving component 213, an election identifier interpreting component 214, an electronic ballot creation component 215, a digital signature component 216, an electronic ballot storing component 217, an electronic ballot retrieving component 218, a digital signature verification component 219, a validation page presenting component 220, and a vote tabulating component 221. These components can perform steps in a method 300, as discussed below with respect to FIG. 3.

Unless otherwise indicated, references herein to communications between application server 104 and voting terminals 101-1 and 101-2 may be assumed to be routed through web server 103. Further, communications between application server 104 and voting terminals 101-1 and 101-2 may be assumed to use encrypted SSL or TSL sessions. As discussed, the SSL or TSL sessions can be implemented using security component 202 on voting terminals 101-1 and 101-2, and security component 206 on web server 103.

Figure 2D:
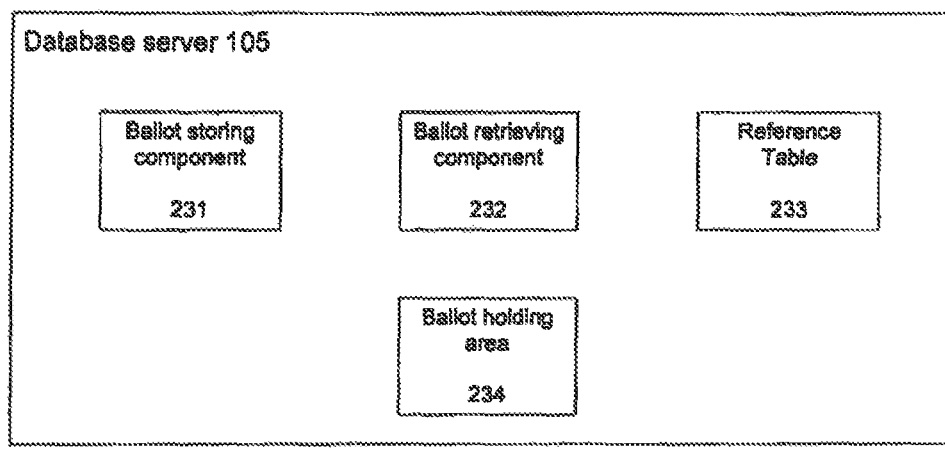
FIG. 2D is a block diagram of an exemplary database server consistent with certain aspects related to the present invention.

FIG. 2D is a block diagram of database server 105. Database server 105 includes a ballot storing component 231 for storing ballots received from application server 104, and a ballot retrieving component 232 for retrieving the stored ballots and providing them to application server 104. Database server 105 also includes a reference table 233 for storing certain data used to conduct an election, as discussed below. Generally speaking, application server 104 will use reference table access component 209 to access reference table 233 on database server 105.

Figure 2E:
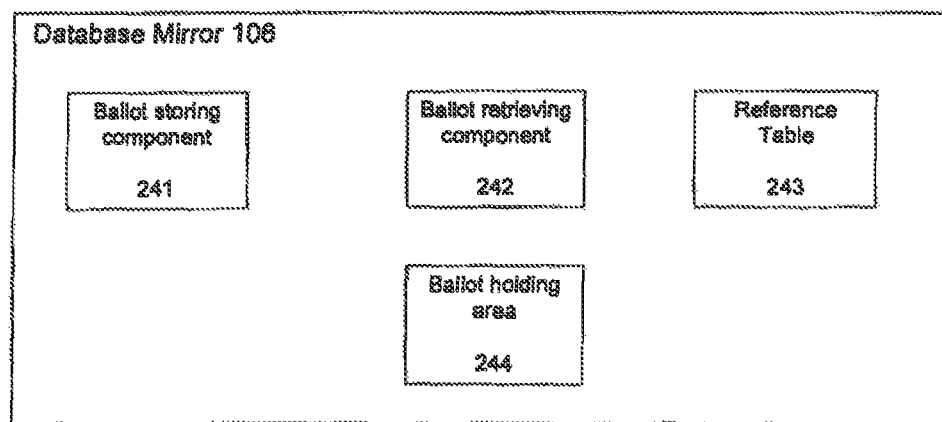
FIG. 2E is a block diagram of an exemplary database mirror consistent with certain aspects related to the present invention.

FIG. 2E is a block diagram of database mirror 106. Database mirror 106 includes a ballot storing component 241 for performing functions similar to those of ballot storing component 231 on database server 105, a ballot retrieving component 242 for performing functions similar to those of ballot retrieving component 232 on database server 105, and a reference table 243 for performing functions similar to those of reference table 233 on database server 105.

Figure 3:
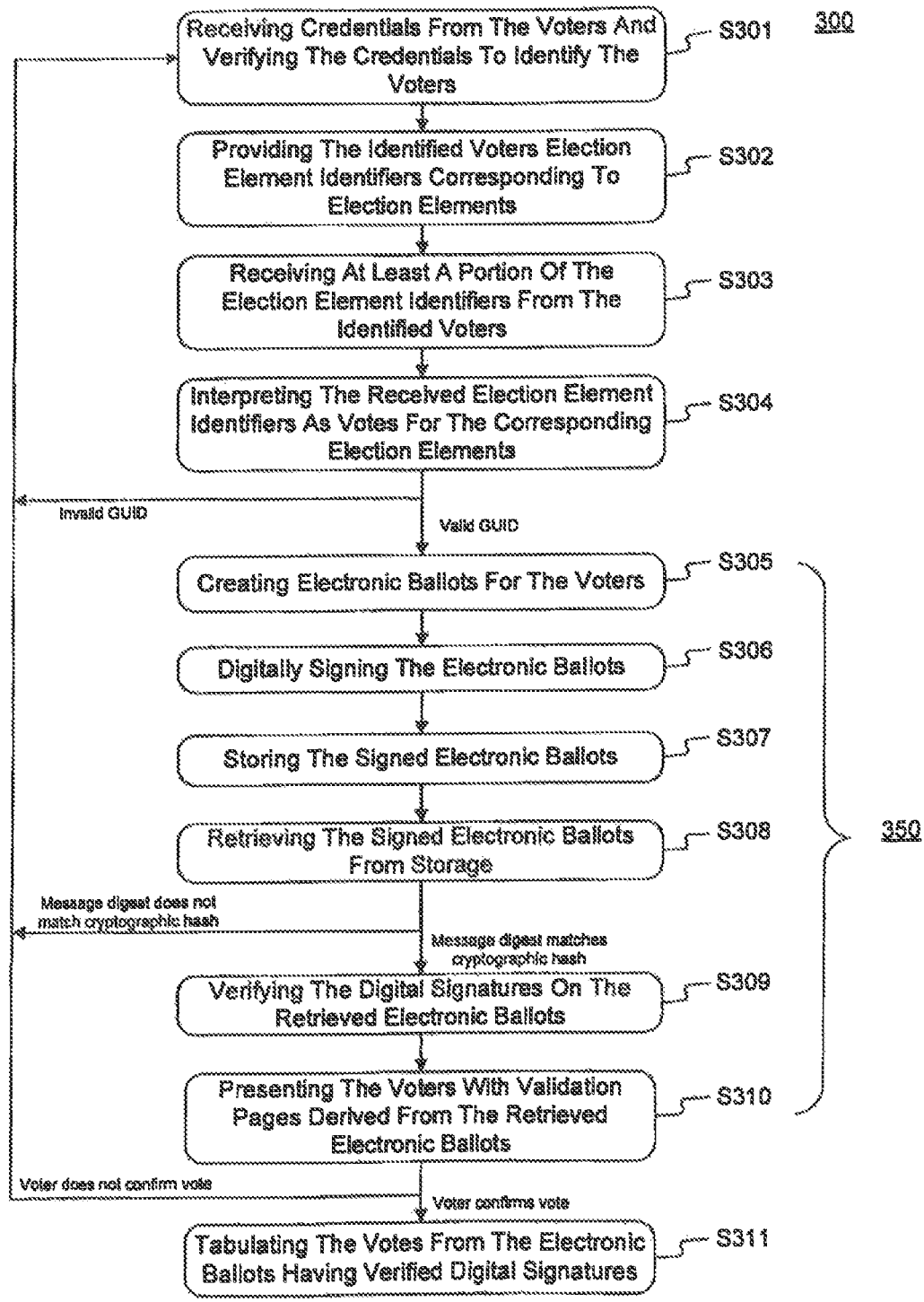
FIG. 3 is an exemplary flowchart for describing detailed steps in a method consistent with certain aspects related to the present invention.

FIG. 3 is an exemplary flowchart 300 of a method consistent with the invention. Flowchart 300 illustrates a method for tabulating votes received from voters using election system 100. An election can be any organized process where individuals vote for one or more particular outcomes. Examples of elections include local or national public elections such as those for choosing elected officials or referenda on ballot initiatives. Other examples of elections include shareholders voting to elect corporate board members or approve corporate decisions, or even public voting for a winner of a contest on television or on the Internet. Voting in an election can be one person one vote, cumulative voting, or any other counting mechanism used to determine an outcome based on voter choices.

The electronic election begins at step S301. At step S301, credential receiving component 211 on application server 104 receives credentials from voters and verifies the credentials to identify the voters, as discussed below. Prior to the election, each voter has been assigned and provided or already knows (e.g. birth date) one or more credentials. Once the election begins, these credentials are used by application server 104 to verify the voters' identity.

A first voter using voting terminal 101-1 and a second voter using voting terminal 101-2 can access application server 104 through web server 103, and enter their credentials in response to a prompt displayed on voting terminals 101-1 and 101-2. While method 300 is discussed as occurring concurrently for both voters, method 300 can be implemented at different times for each voter.

At step S301, credential receiving and verifying component 211 on application server 104 receives credentials from the voters and verifies the credentials to identify the voters, as discussed below.

Step S301 begins when the first voter enters their assigned credentials into voting terminal 101-1, and the second voter enters their assigned credentials into voting terminal 101-2. Voting terminals 101-1 and 101-2 then send, using transmitting component 204, the respective credentials through web server 103 to application server 104.

Credential receiving and verifying component 211 can authenticate the first and second voters with the credentials received over the network, provided that the received credentials match the credentials supplied to the voters before the election. At this time, "trust tokens" can be used to identify central election site 108 to the voters at voting terminals 101-1 and 101-2. Trust tokens are discussed in more detail below with respect to FIG. 9. Generally, trust tokens will only be displayed to those voters who have successfully provided their credentials to identify themselves to application server 104.

At step S302, election identifier providing component 212 on application server 104 provides the identified first and second voters with election element identifiers corresponding to election elements, as discussed below.

After application server 104 receives credentials from each voter, election identifier providing component 212 assigns election identifiers to various election elements, such as a candidate A and a candidate B. Election elements can include any information about the election, including a voter's session identifier, the election itself, the races in the election, candidates in the election, ballot initiatives, referenda, or any other aspect of the election.

In one embodiment, the assigned election identifiers are "GUIDs," or "Globally Unique Identifiers," GUIDs are one example of an identifier complying with the Universally Unique Identifier (UUID) standard. UUIDs such as GUIDs are used to correlate to both a particular voting session and to a particular voter at a single point in time using reference table access component 209 and reference table 223.

As shown in FIG. 2C and FIG. 4, application server 104 may create unique values of GUIDs 401-A1, 401-B1, 401-A2, and 401-B2 using election identifier receiving component 212 and use the reference table access component 209 to store those values in the reference table 223 on database server 105. GUIDs are used to uniquely associate each election element for an individual voting interaction. While GUID values are generally 128-bit identifiers, for simplicity GUID values in reference table 233 are illustrated as 4-digit base-10 GUIDs.

In one embodiment, voters' identities are verified using reference table 233 by the credential(s) that was supplied or known to them in advance. As shown in reference table 233, if the first voter at voting terminal 101-1 uses credential "3518C" to identify themselves to application server 104, application server 104 can use "3518C" to identify those GUIDs which are associated with the first voter. Similarly, if the credential assigned to the second voter at voting terminal 101-2 is "7832R," application server 104 can store values of "7832R" to identify the GUIDs which are associated with the second voter.

For example, candidate A GUID 400-A1 can be designated for use by the first voter at voting terminal 101-1 to select candidate A, and candidate B GUID 400-B1 can be designated for the first voter to select candidate B. Similarly, candidate A GUID 400-A2 and candidate B GUID 400-B2 can be designated for use by voter 2 at voting terminal 101-2, thus enabling candidates A and B as available choices for voter 2. Note that the first voter can use a different GUID than the second voter to refer to the same election element. For example, as shown in FIG. 4, the first voter would use candidate A GUID 400-A1, i.e. 4572, to refer to candidate A. In contrast, the second voter would use candidate A GUID 400-A2, i.e. 1024, to refer to the same candidate, i.e. candidate A.

Figure 5:
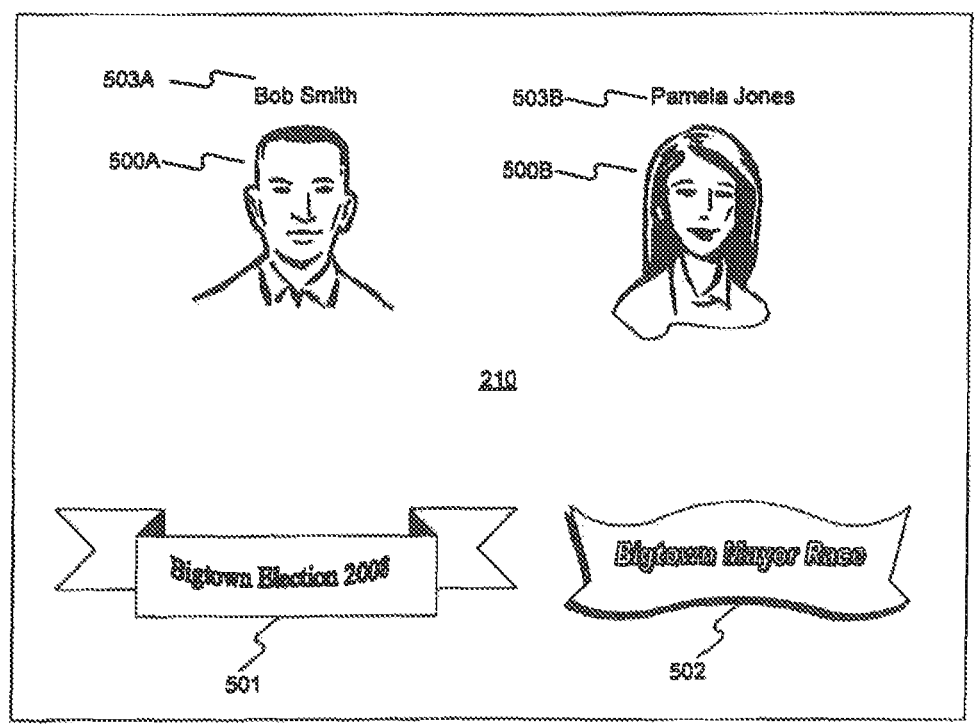
FIG. 5 is a block diagram of an exemplary media storage component consistent with certain aspects of the invention.

As shown in FIG. 5, each election element can be represented in one or more stored media files on election element identification media storing component 210 of application server 104. For example, candidate A can be represented by a stored candidate A photo 500A, and candidate B can be represented by a stored candidate B photo 500B. Candidate A photo 500A and candidate B photo 500B are media files representing the election elements candidate A and candidate B, respectively. Similarly, the 2008 election for Bigtown is represented by Bigtown Election 2008 image 501, and the mayor race in Bigtown is represented by Bigtown Mayor Race image 502.

As shown in FIG. 4, reference table 233 includes a GUID column 401 that stores GUID values, thus correlating GUIDs to media files representing the different election elements. In addition, reference table 233 can be used to resolve election elements to a corresponding media file.

Candidate photos 500A and 500B can also include text image 503A and 503B, respectively. Text image 503A indicates that candidate A's name is "Bob Smith," and text image 503B indicates that candidate B's name is "Pamela Jones." However, candidate photos are not the only types of media files that can be used to represent candidates. For example, videos containing identifying information such as pictures of the candidate can be used to identify the candidates. Further, audio information can be stored in audio or video media files, such as a voice or moving video image saying the candidate's name. These alternate types of media files can be used in place of or in conjunction with candidate photos 500A and 500B to identify the candidates to the voters.

Figure 6A:
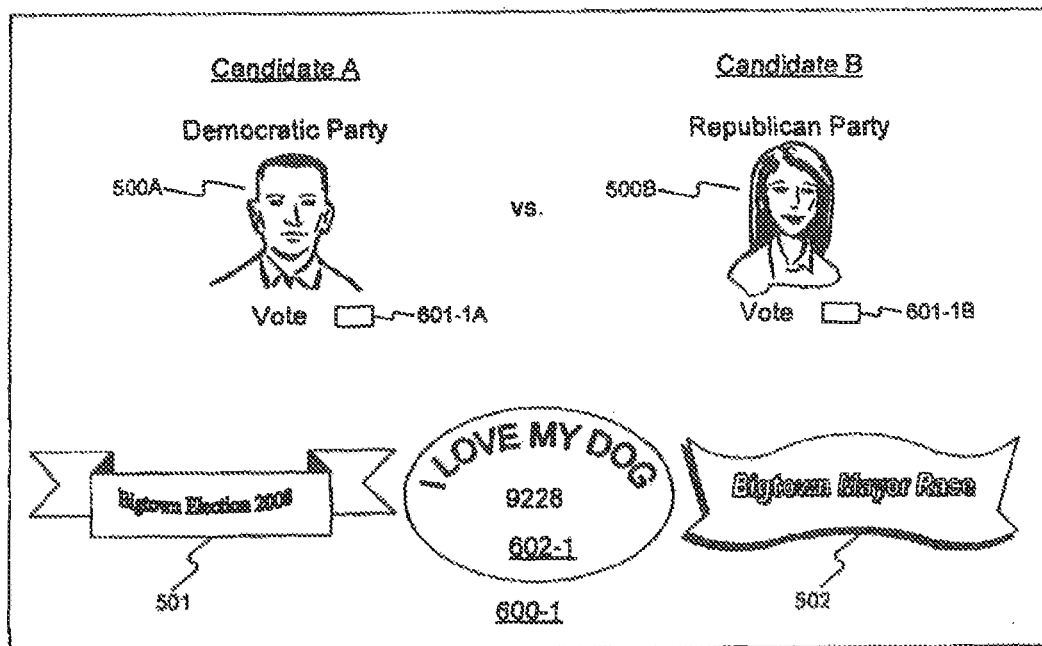
FIG. 6A is an exemplary block diagram of an HTML ballot consistent with certain aspects related to the present invention.
Figure 6B:
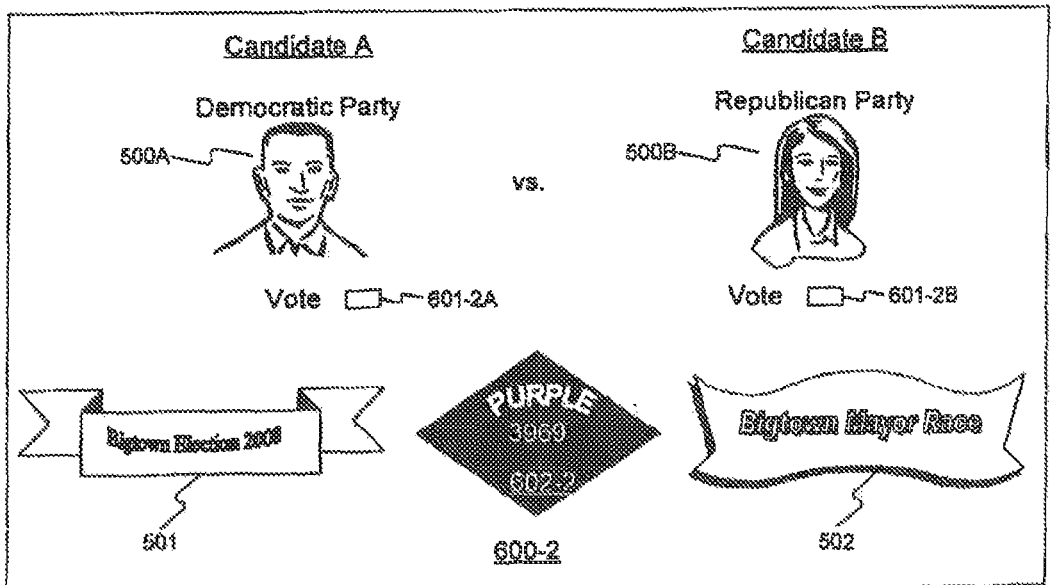
FIG. 6B is an exemplary block diagram of an HTML ballot consistent with certain aspects related to the present invention.

Application server 104 then creates a user-perceivable ballot such as an HTML ballot for both voters. FIGS. 6A and 6B, respectively, illustrate exemplary HTML ballots 600-1 for the first voter at voting terminal 101-1, and 600-2 for the second voter at voting terminal 101-2. The HTML source code for HTML ballot 600-1 includes values of the first voter's assigned GUIDs for each candidate, e.g. candidate A GUID 400-A1 and candidate B GUID 400-B1. Similarly, the HTML source code for HTML ballot 600-2 includes both candidate A GUID 400-A2 and candidate B GUID 400-B2. Application server 104 sends HTML ballot 600-1 over network 102 to voting terminal 101-1, and HTML ballot 600-2 to voting terminal 101-2.

Application server 104 separately sends candidate A photo 500A and candidate B photo 500B to voting terminals 101-1 and 101-2. HTML ballots 600-1 and 600-2 are displayed in web browsers 201 on voting terminals 101-1 and 101-2, concurrently with candidate A photo 500A and candidate B photo 500B. FIG. 6A illustrates a view of first HTML ballot 600-1 as it would appear on voting terminal 101-1, and FIG. 6B illustrates a view of second HTML ballot 600-2 as it would appear on voting terminal 101-2.

HTML ballot 600-1 and HTML ballot 600-2 may each be displayed with several images to enable the voters to understand the ballot. For example, candidate A photo 500A, candidate B photo 500B, Bigtown Election 2008 image 501, and Bigtown Mayor Race image 502 may all be displayed with HTML ballots 600-1 and 600-2. Images 602-1 and 602-2 are signed trust tokens, to be discussed later in greater detail.

The first voter at voting terminal 101-1 decides to vote for candidate A, and registers a selection with choice response element 601-1A corresponding to candidate A. Similarly, the second voter at voting terminal 101-2 decides to vote for candidate B, and registers a selection with choice response element 601-2B, corresponding to candidate B.

At step S303, election identifier receiving component 213 on application server 104 receives at least a portion of the election element identifiers as votes for the corresponding election elements, as discussed below.

For example, because the first voter at voting terminal 101-1 selected candidate A, voting terminal 101-1 will send the corresponding GUID values, i.e. candidate A GUID 401-A1 value of "4572", back to application server 104 to indicate a vote for candidate A. Similarly, voting terminal 101-2 will send candidate B GUID 401-B2 value of "5517" back to application server 104, to indicate a vote for candidate B. Election identifier receiving component 213 receives the voted GUIDs over network 102. This technique allows voting terminals 101-1 and 101-2 to indicate their corresponding voting choices to application server 104 without allowing a snooping attacker to discern the voting choices of the first and second voters. Using GUIDS to obscure communications between voting terminal 101 and application server 104 is discussed in more detail below.

At step S304, election identifier interpreting component 214 on application server 104 interprets the received election element identifiers as votes for the corresponding election elements, as discussed below.

For example, election identifier interpreting component 214 can interpret the received GUID value "4572" voted by the first voter at terminal 101-1 (namely 401-A1) and see if that GUID value is a valid GUID for the first voter. Assuming that no failure due to an attack or other cause corrupts the transmission of the voted GUIDs, the GUID value received from the first voter will be "4572," which matches candidate A GUID 401-A1. Election identifier interpreting component 214 reads reference table 233 using reference table access component 209. By reading reference table 233, election identifier interpreting component 214 is able to interpret the received GUID value as a vote for candidate A. Likewise, election identifier interpreting component 214 interprets the GUID value from the second voter as a vote for candidate B if the GUID value received from voting terminal 101-2 matches the candidate B GUID 401-B2 value, i.e. "5517," In this case, the method proceeds to step S305.

However, if a voted GUID value is invalid, i.e. does not match one of the voter's assigned GUIDs, application server moves back to step S101. For example, if application server 304 receives a GUID value other than "4572" or "7897" from voting terminal 101-1, the method goes to back to step S101 for voting terminal 101-1, and new GUIDs are generated for each of the election elements for the first voter at voting terminal 101-1. Similarly, if a GUID value other than "1024" or "5517" is received from voting terminal 101-2, the method goes to step S101 for voting. terminal 101-2, and new GUIDs are assigned to the election elements. At this time, application server 104 will also log information about the invalid GUID such as the time the GUID was received and the identity of the voting terminal that sent the invalid GUID Steps S305 to S310 may used to ensure that central election site 108 accurately records the received votes as electronic ballots. Thus, steps S305-S310 constitute a method 350 for ensuring the integrity of the electronic ballots. As discussed below, method 350 may be integrated into method 300, and steps S305-S310 will be discussed with respect to method 300. However, method 350 may be implemented independently of method 300 in various embodiments where it is desirable to ensure the integrity of an electronic ballot.

At step S305, electronic ballot creation component 215 on application server creates electronic ballots for the voters based on the received votes, as discussed below.

As shown in FIGS. 7A and 7B, electronic ballot creation component 215 will create a first electronic ballot 700-1 for the first voter at voting terminal 101-1, and a second electronic ballot 700-2 for the second voter at voting terminal 101-2. Note that electronic ballots 700-1 and 700-2 respectively constitute executed versions of HTML ballots 600-1 and 600-2, thus representing the choices the voters selected on their respective HTML ballots. In one embodiment, electronic ballots 700-1 and 700-2 comprise XML code.

Electronic ballots 700-1 and 700-2 may be stored in volatile memory such as RAM on application server 104, although those skilled in the art will appreciate that in some embodiments nonvolatile memory may be used in addition to or instead of RAM. For example, in virtual memory implementations, RAM may be used in conjunction with a hard drive on application server 104 to store electronic ballots 700-1 and 700-2. In other implementations, nonvolatile memory such as flash memory may be used instead of volatile RAM.

Application server 104 may store electronic ballots 700-1 and 700-2 using representations other than the GUIDs sent by voting terminals 101-1 and 101-2. For example, application server 104 may store database keys representing the candidates who were voted for. Application server 104 reads reference table 233 to translate the GUID values into the corresponding database key. For example, candidate_key_A may be the primary key for candidate A in database server 105, and candidate_key_B may be the primary key for candidate B in database server 105.

Thus, as shown in FIG. 7A, electronic ballot creation component 215 includes candidate key_A in selected election element field 702-1 of electronic ballot 700-1 for the first voter at voting terminal 100-1, because the first voter provided the candidate A GUID 401-A1 value of 4572 indicating a vote for candidate A. Similarly, electronic ballot creation component 215 includes candidate key_B in selected election element field 702-2 of electronic ballot 700-2 for the second voter at voting terminal 100-2, because the second voter provided the GUILD 401-B2 value of 5517, indicating a vote for candidate B. Electronic ballots 700-1 and 700-2 also have race fields 701-1 and 701-2, respectively, to identify which race they correspond to. In this case, electronic ballots 701-1 and 701-2 are both voted ballots in the race for the mayor of Bigtown.

Fields 701 and 702 may be conceptualized as a "base" electronic ballot, as fields 701 and 702 generally include stored information relevant to the election itself, e.g. the voter's choice in a given race. In some embodiments, as discussed below in more detail, fields 703-706 are included in electronic ballots 700-1 and 700-2 for encryption purposes. Further, as discussed below, fields 707-709 may be included in electronic ballots 700-1 and 700-2 for digital signature purposes.

At step S306, digital signature component 216 on application server 104 digitally signs the electronic ballots, as discussed below.

Digital signature component 216 generates a first cryptographic hash, or message digest, of electronic ballot 700-1, and a second cryptographic hash, or message digest, of electronic ballot 700-2. In particular, the first cryptographic hash is a hash of fields 701-1 and 701-2, and the second cryptographic hash is a hash of fields 701-2 and 702-2. Thus, the cryptographic hashes are performed on the "base" electronic ballots represented by fields 701 and 702. These message digests can be created, for example, using SHA1 or other suitable hashing algorithms known to those skilled in the art.

The message digests serve as unique identifiers for the contents of electronic ballots 700-1 and 700-2, such that it is computationally infeasible to generate a different electronic ballot that will hash to the same message digest. Thus, these message digests can be used to ensure that the contents of electronic ballots 700-1 and 700-2 have not been altered.

Digital signature component 216 then creates digital signature 709-1 by encrypting the first message digest for electronic ballot 700-1 with an encryption key. In some embodiments, the encryption key used by digital signature component 216 at this step is a private key from a public/private key pair such as are used in RSA (Rivest, Shamir, Adelman) or DSA (digital signature algorithm). Digital signature component 216 then appends digital signature 709-1 to the encrypted electronic ballot 700-1. Similarly, digital signature component 216 creates digital signature 709-2 by encrypting the second message digest for electronic ballot 700-2 with the private key, and appends digital signature 709-2 to the encrypted electronic ballot 700-2.

While creating the digital signatures, digital signature component 216 also may append some information for the digital signatures to electronic ballots 700-1 and 700-2. For example, digital signature component 216 may append hash method identifiers 707-1 and 707-2, certificate serial numbers 708-1 and 708-2, and digital signatures 709-1 and 709-2.

At step S307, electronic ballot storing component 217 on application server 104 stores the signed electronic ballots, as discussed below.

Electronic ballot storing component 217 sends signed encrypted electronic ballots 700-1 and 700-2 over network 107 to database server 105. For redundant storage, either database server 105 or electronic ballot storing component 217 can send a copy of the signed encrypted electronic ballots 700-1 and 7002 to database mirror 106. The signed electronic ballots can be stored in ballot holding areas 234 and 244 on database server 105 and database mirror 106, respectively. Ballot holding areas 234 and 244 are used to store the signed electronic ballots until the ballots are verified by a voter, as discussed below.

Ballot storing components 231 and 241 will generally store the signed encrypted ballots in nonvolatile storage such as a hard drive, although in many embodiments they will also be temporarily stored in RAM on database servers 105 and 106 before being moved to the nonvolatile storage. Once the signed electronic ballots have been stored on database server 105, application server 104 may delete part or all of the electronic ballots.

By eliminating the electronic ballots from any volatile or nonvolatile storage on application 104, it will be possible to prove that the electronic ballots stored on database server 105 accurately reflect the choices received from the voters at step S303. Immediately after deleting the electronic ballots, an auditor may inspect application server 104 to ensure that no electronic ballots are remaining in volatile or nonvolatile storage. In some embodiments, not only are the electronic ballots themselves wiped from application server 104, but any election data, such as data from reference table 233, may be completely eliminated from application server 104.

At step S308, electronic ballot retrieving component 218 on application server 104 retrieves the signed electronic ballots from storage. For example, shortly after storing the signed, encrypted electronic ballots 700-1 and 700-2, electronic ballot retrieving component 218 can retrieve ballots 700-1 and 700-2 from ballot holding area 234 on database server 105 to subsequently verify their integrity on database server 105. In some embodiments, each electronic ballot is retrieved and verified immediately after the electronic ballot is deleted from memory on application server 104.

At step S309, digital signature verification component 219 on application server 104 verifies the digital signatures on the retrieved electronic ballots, as discussed below.

Digital signature verification component 219 performs a first cryptographic hash of electronic ballot 700-1. In some embodiments, the hash will be performed on the base electronic ballot, e.g. fields 701-1 and 701-2. Digital signature verification component 219 also decrypts first digital signature 709-1 using the public key from the public/private key pair to obtain a first message digest for electronic ballot 700-1.

The first cryptographic hash is compared to the first message digest, and if a match is obtained, digital signature verification component 219 has verified that electronic ballot 700-1 has remained intact since originally being signed by application server 104. Digital signature verification component 219 performs a similar process for electronic ballot 700-2, generating a second cryptographic hash of electronic ballot 700-2 and comparing the second cryptographic hash with a second message digest obtained by decrypting digital signature 709-2.

For electronic ballots that are verified to be intact, the method proceeds to step S310 to allow the voters to validate their choices. However, if a message digest does not match the calculated cryptographic hash, this indicates that a particular ballot was improperly stored or altered since the digital signature was appended at step S309. In this case, the method returns to step S301, and the voter is given another opportunity to cast their vote.

In some embodiments, the method does not return to step S301, and the voter may not be allowed to cast another vote. In other embodiments, the voter may have to take other steps to participate in the election. For example, the voter may have to present physical identification to receive a new set of credentials before returning to step S301. It is also useful to store certain information if the decrypted message digest does not match the calculated hash, such as voter credentials and identification, the time when the electronic ballot was initially stored on database server 105, and the time when the electronic ballot was retrieved from database server 105.

Note that because the electronic ballots were deleted from application server 104 at step S307, it is possible to be certain that the electronic ballots retrieved at step S308 are the ballots stored on database server 105, rather than a local copy on application server maintained on 104. This can be useful, for example, to prove to an auditor that database server 105 includes an accurate copy of the ballot created at step S307, and not a copy placed on application server 104 by an attacker. Further, because the messages digest will only properly decrypt with the public key if they were encrypted with the private key, it is possible to ensure that the electronic ballots were signed by application server 104, and not signed or altered by an attacker, provided that the private key from the public/private key pair has not been compromised.

At step S310, validation page presenting component 220 on application server 104 presents the voters with validation pages derived from the retrieved electronic ballots, as discussed below.

Figure 8A:
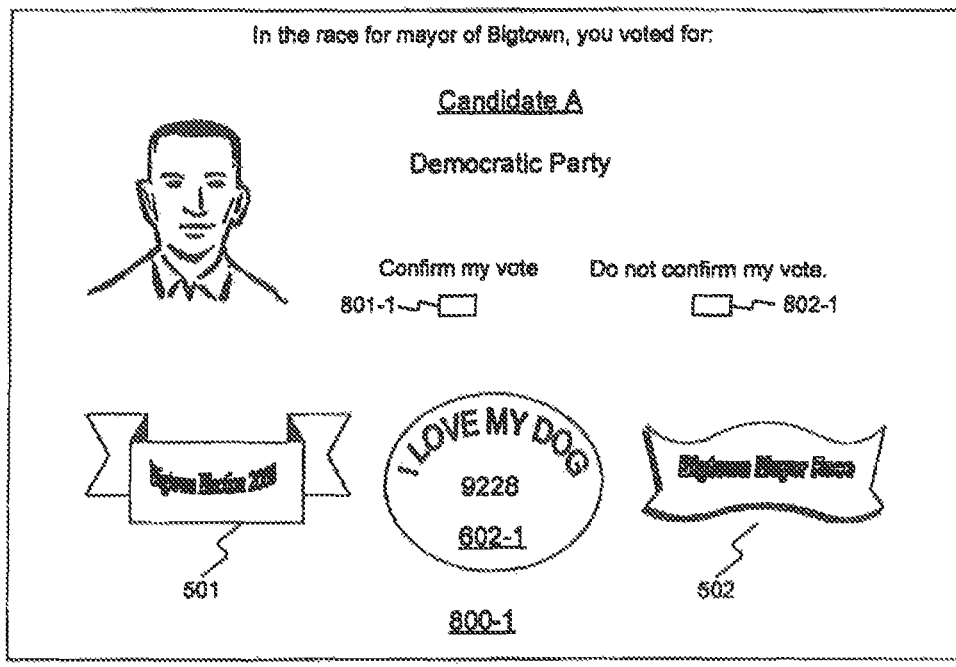
FIG. 8A is a block diagram of an exemplary validation page consistent with certain aspects related to the present invention.
Figure 8B:
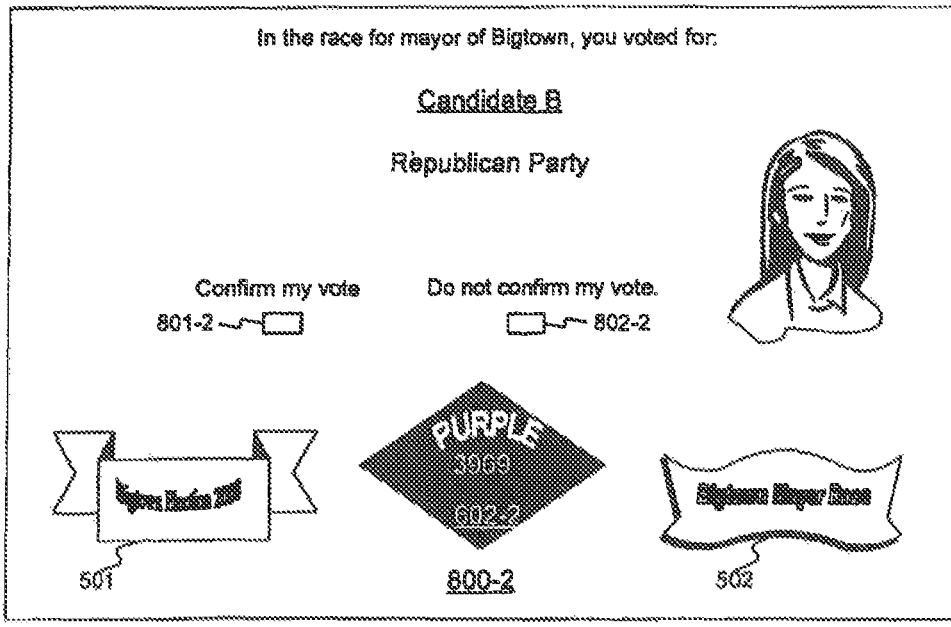
FIG. 8B is a block diagram of an exemplary validation page consistent with certain aspects related to the present invention.

Validation page presenting component 220 receives electronic ballots 700-1 and 700-2, from digital signature verification component 219. As shown in FIGS. 8A and 8B, validation page presenting component 220 then creates a validation page 800-1 for the first voter at voting terminal 101-1 and a validation page 800-2 for the second voter at voting terminal 101-2. Validation page presenting component 220 then sends the respective validation pages to voting terminals 101-1 and 101-2.

Note that validation page presenting component 220 is creating validation pages 800-1 and 800-2 based on the electronic ballot retrieved from database server 105. Validation pages are not created based directly on the received GUIDs or other information stored on application server 104; indeed in some embodiments this would be impossible as all such data is erased from application server 104. Thus, it is possible to prove that validation pages accurately reflect the content of database server 105.

Voting terminal 101-1 displays validation page 800-1 to the first voter, and voting terminal 101-2 displays validation page 800-2 to the second voter. As shown, validation page 800-1 accurately reflects the choice of candidate A at voting terminal 101-1 by the first voter, and validation page 800-2 accurately reflects the choice of candidate B. The voters can click "Confirm my vote" input element 801-1 and 801-2 respectively, and voting terminals 101-1 and 101-2 will transmit information over network 102 indicating to application server 104 that the votes have been validated. In some embodiments, when a voter confirms their vote, the corresponding electronic ballot is moved from ballot holding area 234 to ballot storing component 231. Thus, ballot holding area 234 can store electronic ballots awaiting validation, and ballot storing component 231 can store only validated ballots. In other embodiments, application server 104 can simply mark ballots as validated once voters confirm their choices.

In certain embodiments, validation pages 800-1 and 800-2 can be presented for each decision a voter makes in a given election, thus allowing voters to do interim validations for each vote they cast in the election. For example, a voter would perform receive a validation page each time they voted for a candidate in a given race, and also for each referendum or other election choice. In other embodiments, a voter's selections across an entire election are combined into a single validation page. In such embodiments, validation pages 800-1 and 800-2 would include information reflecting each selection the voter made in the election.

When a voter does a final validation of their votes, multiple images representing election elements can be combined into an individual image that represents the combination of election elements. For example, a final validation page could include a single image file with a picture of a voter's chosen candidate for mayor along with a picture of the voter's chosen candidate for sheriff. When a final validation page is used, votes are not fully validated until the voter approves the collection of all of their votes in the final validation page.

In other embodiments, one or more audio files can be used in place of, or in conjunction with, image files to allow a voter to confirm their selections. The audio files may contain recordings of the voter's selected candidate, or recordings of other individuals, speaking the candidate's name. In some embodiments, final or interim validation images can be distorted to prevent detection of similar images based on file size or by calculating hash values of different files. In some embodiments, images contain watermarks to authenticate them as images provided by application server 104.

In some embodiments, validation pages 800-1 and 800-2 include a CAPTCHA that the voter must complete in order to validate their selection. As known in the art, a CAPTCHA is a challenge-and-response test to distinguish between a computer and a human, typically requiring that human users verify themselves by correctly identifying a series of distorted letters. If validation page 800-1 and 800-2 include audio files, the audio files may contain an audio CAPTCHA that must be completed to validate the votes.

In place of a CAPTCHA, an accessible audio identification technique can be used. In this technique, several audio files representing a single subject can be sent from application server 104 to voting terminals 101-1 and 101-2. Voters must correctly identify the common subject in order to validate their votes. For example, an audio file of a dog barking, and an audio file of a person training their dog to fetch can be presented to the voters. The voters must correctly choose "dog" as the subject out of a series of options in order to validate their votes. In some embodiments, the audio files are accompanied by images or videos representing the same subject as the audio files.

For voters who successfully validate their votes, application server 104 can separate any identification data for the voters (such as voting terminal column 402 from reference table 233, or any credentials information, user ID, or other information) from the voter's selections. Validated votes are stored by application server 104 on database 105, and any voter identification data can be discarded or stored in a separate database. In this way, it is impossible to use database 105 to associate voter identifications with voter selections, i.e. one cannot discern from database 105 which individuals voted for which candidates.

For voters who validated their votes by selecting "confirm my vote," the method moves to step S310. For voters who instead select "Do not confirm my vote," the method returns to step S301, and the voters are required to re-enter their credentials in order to proceed through method 300 again. In other embodiments, voters who do not confirm their votes are not required to re-enter their credentials, but simply return to step S308 where their ballots are retrieved again from storage and another opportunity is provided to confirm their vote. In still further embodiments, voters who do not confirm their vote return to step 3302, where new GUIDs are generated and the voters cast their votes again. Regardless of how method 300 is implemented for voters who do not confirm their votes, the corresponding electronic ballots may be deleted from ballot holding area 234 when the voters do not confirm their votes.

At step S311, vote tabulating component 221 on application server 104 tabulates the validated votes on database server 105, as discussed below.

Vote tabulating component 221 retrieves the validated votes from database 105 and counting the votes for each candidate. Application server 104 can retrieve the votes in arbitrary order, such as by GUID. The tabulated results then can be used to determine an election winner.

Encrypted Electronic Ballots

As discussed above, digital signature component 216 may sign electronic ballots 700-1 and 700-2 at step S306. In some embodiments, electronic ballots 700-1 and 700-2 may be encrypted by encryption component 222 before they are digitally signed. In some embodiments, digital signature component 216 will use a symmetric encryption algorithm such as AES (advanced encryption standard), DES (data encryption standard), TwoFish, or 3DES (triple DES).

In some embodiments, encryption component 222 will encrypt "base" electronic ballot fields 701 and 702. To each electronic ballot, encryption component 222 will append encryption algorithm identifiers 703-1 and 703-2, key bit lengths 704-1 and 704-2, encryption keys 705-1 and 705-2, and encryption algorithm initialization vectors 706-1 and 706-2 in voted electronic ballots 700-1 and 700-2. In such embodiments, digital signatures 709-1 and 709-2 can be computed not only for "base" electronic ballot fields 701 and 702, but also for fields 703-706.

As understood by those skilled in the art, if digital signatures are computed for the encryption fields 703-706 as well as base electronic ballot fields 701 and 702, digital signature component 216 will need to calculate cryptographic hashes based on all of these fields to create a message digest that will match the decrypted digital signature at step S309. In this manner, it is possible to ensure not only that fields 701 and 702 have not been altered for a given electronic ballot, but also that appended encryption information 703-706 is also secure.

Remote RSA Encryption

In other embodiments, electronic ballots 700-1 and 700-2 are encrypted using public key encryption rather than symmetric encryption. In such embodiments, encryption component 222 will encrypt electronic ballots 700-1 and 700-2 using a public key from a public/private key pair. An election official can be provided with a corresponding private key using a secure channel. Thus, only the election official can decrypt the encrypted electronic ballots. In some embodiments, the election official will have the key on a computer-readable medium such as a flash drive, and application server 104 will be unable to decrypt the electronic ballots until the flash drive is installed in application server 104.

In such embodiments, once an auditor (or the election official) verifies at step S307 that election data has been deleted from application server 104, it is impossible for application server 104 to interpret the encrypted electronic ballots on database server 105. This provides an added layer of security by allowing the election official to do any required auditing of application server 104 while securely holding onto the private key. Once the auditing is completed, the election official can provide the private key, thus allowing application server 104 to begin decrypting the votes. This provides additional confidence that the validation pages presented to the voters at step S310 are indeed derived from secure electronic ballots on database server 105.

In some embodiments, application server 104 can also be wiped clean after step S310. In such embodiments, application server will need perform steps similar to steps S308 and S309, e.g. again retrieving and verifying the signed electronic ballots from storage before tabulating the votes, along with any required decryption of the electronic ballots. This can provide a second entry point for auditing the election. In embodiments where an election official controls a private decryption key, step S311 cannot take place until the election official agrees that application server 104 is secure, and provides the private key for decrypting the electronic ballots in ballot storing component 231. In some embodiments, application server 104 will display each digital signature to the election official or auditor to prove that each retrieved ballot is a ballot signed at step S306.

Trust Token

Figure 9:
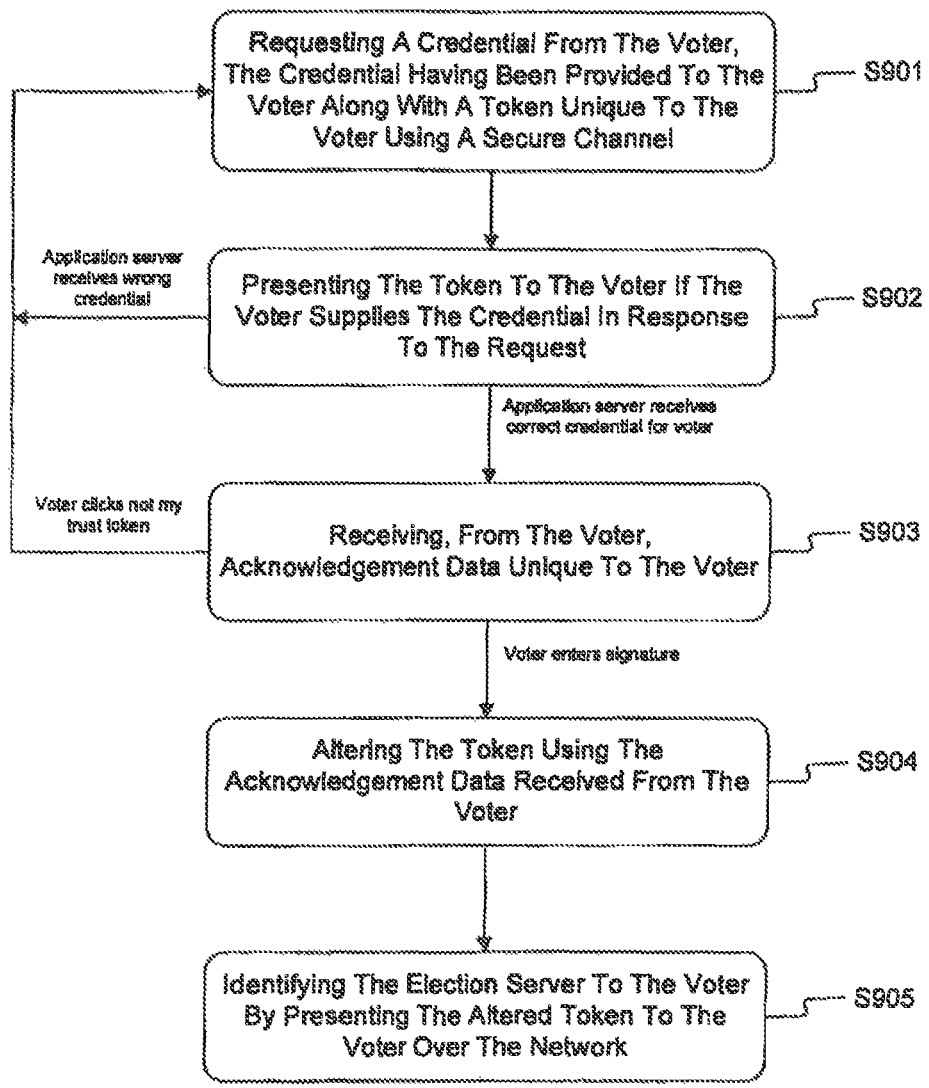
FIG. 9 is an exemplary flowchart for describing detailed steps in a method for identifying an election server to a voter over a network consistent with certain aspects related to the present invention.

FIG. 9 is an exemplary flowchart 900 of a method consistent with the invention. Flowchart 900 illustrates a method for identifying application server 104 to a voter at voter terminal 101 using election system 100. The method can be implemented, for example, using credential receiving and verifying component 211 of application server 104.

Figure 10:
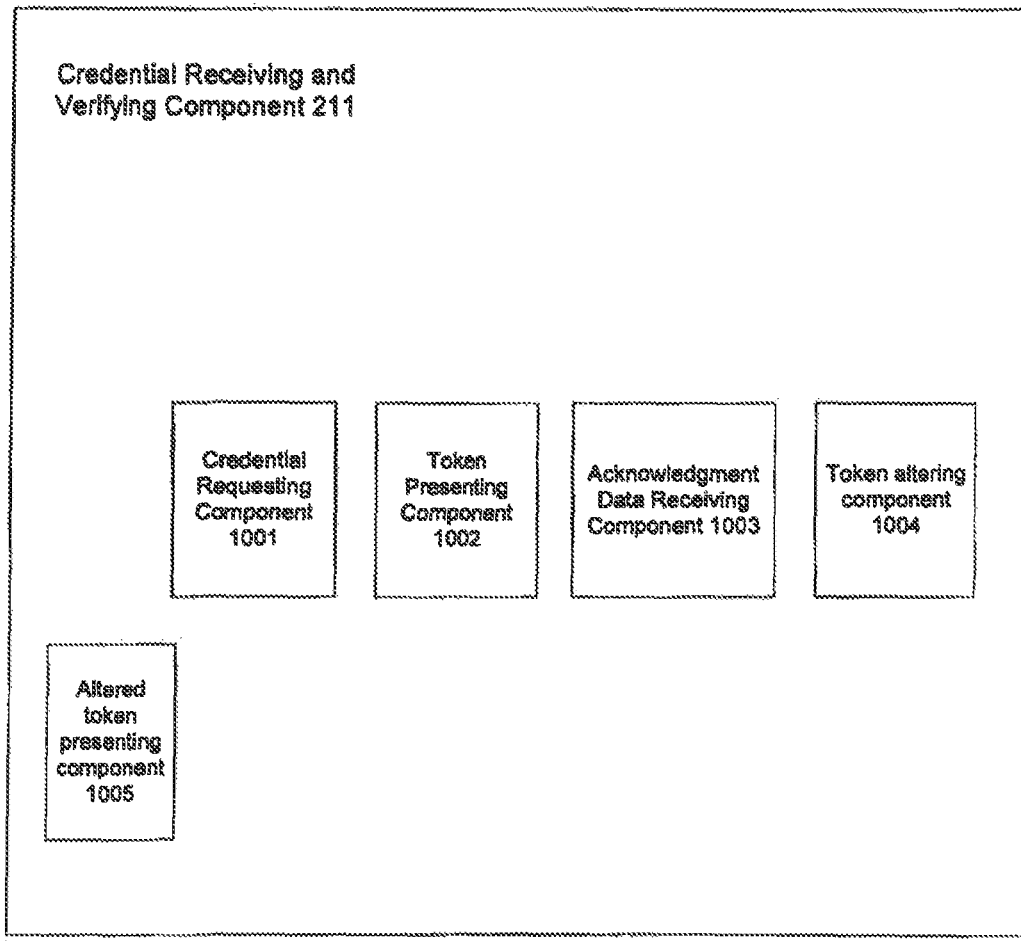
FIG. 10 is a block diagram of an exemplary credential receiving and verifying component consistent with certain aspects related to the present invention.

As shown in FIG. 10, credential receiving and verifying component 211 may include a credential requesting component 1001, a token presenting component 1002, an acknowledgement data receiving component 1003, a token altering component 1004, and an altered token presenting component 1005. These components can be used to implement method 900, as discussed below.

Before step S901, the first voter and the second voter are provided with verification data such as a token, and one or more credentials. The credentials can be generated by application server 104, or can be generated simply by having each voter provide some information already known to each voter. For example, a credential could be a birth year, a 4-digit PIN, a password, or a membership number. The generated credential can be composed in whole or part of information supplied by each voter, such as the password or birth year. In a certain embodiments, multiple credentials are generated for each voter, so that each voter has at least a first credential and a second credential. For the sake of brevity, one credential will be discussed for each voter. The first voter has been provided a credential "3518C," and the second voter has been provided credential "7832R."

In one embodiment, a unique trust token is assigned to each voter, and is not chosen by the voters but rather by application server 104. As shown in FIG. 11A, trust tokens 1101-1 and 1101-2 for the first voter and the second voter can be, for example, a random combination of a shape and a color, along with a randomly generated four-digit number. For example trust token 1100-1 is a white circle with the number "9228," and trust token 1100-2 is a black diamond with the number "3969,"

As shown in FIG. 11B, trust tokens 1101-1 and 1101-2 can be represented on application server 104 by stored trust token files 1108-1 and 1108-2, respectively. Trust tokens files 1108-1 and 1108-2 may include shape attributes 1104-1 and 1104-2, color attributes 1105-1 and 1105-2, random number attributes 1106-1 and 1106-2, and signature attributes 1107-1 and 1107-2. More broadly, trust tokens can be any information that can be unique to a voter, such as an alphanumeric code.

Before step S901, the first voter is provided the credential "3518C" with trust token 1101-1, and the second voter is provided credential "7832R" with trust token 1101-2. The first and second voters are provided with their respective trust tokens and credentials using a secure channel. For example, the secure channel could be an SSL or TSL session over network 102 between voting terminal 101 and application server 104. Alternately, the credentials and trust tokens could be sent to voters using a physical secure channel such as by mail or in person delivery. In one embodiment, voters are provided with credentials and trust tokens when they register to vote. Regardless of what secure channel is used to provide the credentials and tokens to the voters, the voters are informed to safeguard both their trust tokens and their credentials. In the discussion below it is assumed that each voter is provided with a single credential. However, in certain embodiments voters are provided with and required to enter multiple credentials.

At step S901, credential requesting component 1001 requests a credential from the voter, the credential having been provided to the voter along with a token using a secure channel, as discussed below.

Step S901 will usually occur once an election has actually begun, e.g. during step S301 of the method shown in flowchart 300. Voters access application server 104 through web server 103. Credential requesting component 1001 requests the credential from each voter, for example by sending voting terminals 101-1 and 101-2 a web form that requests that the first and second voters enter their respective credentials. Voting terminals 101-1 and 101-2 send the credentials "3518C" and "7832R" respectively, to application server 104.

At step S902, token presenting component 1002 presents the token to the voters if the voters have supplied the credentials in response to the request, as discussed below.

For example, if the first voter at voting terminal 101-1 has correctly entered their previously received credential, token presenting component 1002 can present trust token 1101-1 to the first voter by sending trust token 1101-1 to voting terminal 101-1. Web browser 201 on voting terminal 101-1 can display trust token 1101-1 in trust token verification window 1100-1, as shown in FIG. 11A. At this point, because the voter has correctly entered their assigned credential, application server 104 can proceed knowing that the first voter is using voting terminal 101-1, and not an attacker masquerading as a legitimate voter. Similarly, because application server 104 has sent the correct trust token 1101-1 to voting terminal 101-1, the first voter knows that they are indeed communicating with application server 104, and not a spoofing attacker.

Also at step S902, a similar process is performed for the second voter at voting terminal 101-2. The second voter enters their credential into voting terminal 101-2, and receives their trust token 1101-2 from token presenting component 1002. Web browser 201 on voting terminal 101-2 displays trust token 1101-2 in trust token verification window 1100-2. In this manner, application server 104 knows it is communicating with the true second voter, and the second voter knows they are communicating with the true application server.

As shown in FIG. 9, if application server 104 receives the wrong credential for any voter, the method returns to step S901 and the voter is given another opportunity to enter the correct credential.

At step S903, acknowledgment data receiving component 1003 receives, from the voters, acknowledgement data unique to the voters, as discussed below.

The first voter at voting terminal 101-1 can verify trust token 1101-1 by entering acknowledgement data into trust token confirmation box 1102-1. The acknowledgement data can be any "signature" that the first voter wishes to enter. In one embodiment, the signature is a text string, although the signature could be virtually any data including media files such as images, video, or audio. The first voter decides to enter "I LOVE MY DOG" as their signature into trust token confirmation box 1102-1, and presses the enter key. Web browser 201 on voting terminal 101-1 sends the text string "I LOVE MY DOG" to acknowledgment data receiving component 1003. When acknowledgment data receiving component 1003 receives the text string, acknowledgment data receiving component 1003 adds the text string to signature attribute 1107-1 of trust token file 1108-1.

Also at step S903, a similar process is performed for the second voter at voting terminal 101-2. The second voter decides to enter the string "PURPLE" for their favorite color into trust token confirmation box 1102-2, and presses the enter key. Acknowledgment data receiving component 1003 receives the text string and adds it to signature attribute 1107-2 of trust token file 1108-2.

If, however, any voter does not agree that the trust token is correct, the voter can click "not my trust token." In this case, as shown in FIG. 9, the method proceeds back to step S901 and the voter is given another opportunity to enter their credential.

In one embodiment, voters are informed when they receive their credentials and trust tokens that they will be prompted to enter acknowledgement data (signatures) into a web form when trying to participate in the electronic election. Thus, when the voters initially receive their credentials and trust token using the secure channel, they will know that when the time comes to vote in the electronic election, they should only enter the acknowledgement data if web browser 201 displays the correct trust token after they enter their credential.

At step S904, token altering component 1004 alters the tokens using the acknowledgement data received from the voters, as discussed below.

For example, token altering component 1004 may "sign" the trust tokens with the signatures by modifying the trust tokens to include the signatures. As shown in FIG. 11C, application server creates signed trust token 602-1 for the first voter at voting terminal 101-1, and creates signed trust token 602-2 for the second voter at voting terminal 602-2. Signed trust tokens 602-1 and 602-2 may comprise of a single image file combining the unsigned trust token with the signature, or may comprise multiple files.

At step S905, altered token presenting component 1005 identifies application server 104 to the voters by presenting the altered tokens to the voters over network 102, as discussed below.

In one embodiment, altered token presenting component 1005 continually identifies itself to the voters by presenting the altered tokens to the voters over network 102. During the course of the election, application server 104 may present any number of new web pages to the first voter by sending the web pages over network 102 to voting terminal 101-1. For example, when HTML ballot 600-1 is sent to voting terminal 101-1 at step S303 above, altered token presenting component 1005 can include signed trust token 602-1 in HTML ballot 600-1.

If there are multiple races in the election, application terminal 103 can send one HTML ballot for each race, or combine several races on one ballot. In any event, each time application server 104 sends a new web page to voting terminal 101-1, altered token presenting component 1005 embeds signed trust token 602-1 in the web page. In this manner, the first voter at voting terminal 101-1 can be certain that any web pages appearing in web browser 201 on voting terminal 101-1 were originally sent by application server 104, and not an attacker.

Similarly, as the second voter at voting terminal 101-2 proceeds through the election, signed trust token 602-2 is displayed at each step so that the second voter is certain they are actually communicating with application server 104. For example, when HTML ballot 600-2 is sent to voting terminal 101-2, altered token presenting component 1005 embeds signed trust token 602-2 into HTML ballot 600-2. Signed trust tokens 602-1 and 602-2 also appear in validation pages 800-1 and 800-2, respectively.

Data Obfuscation

Figure 12:
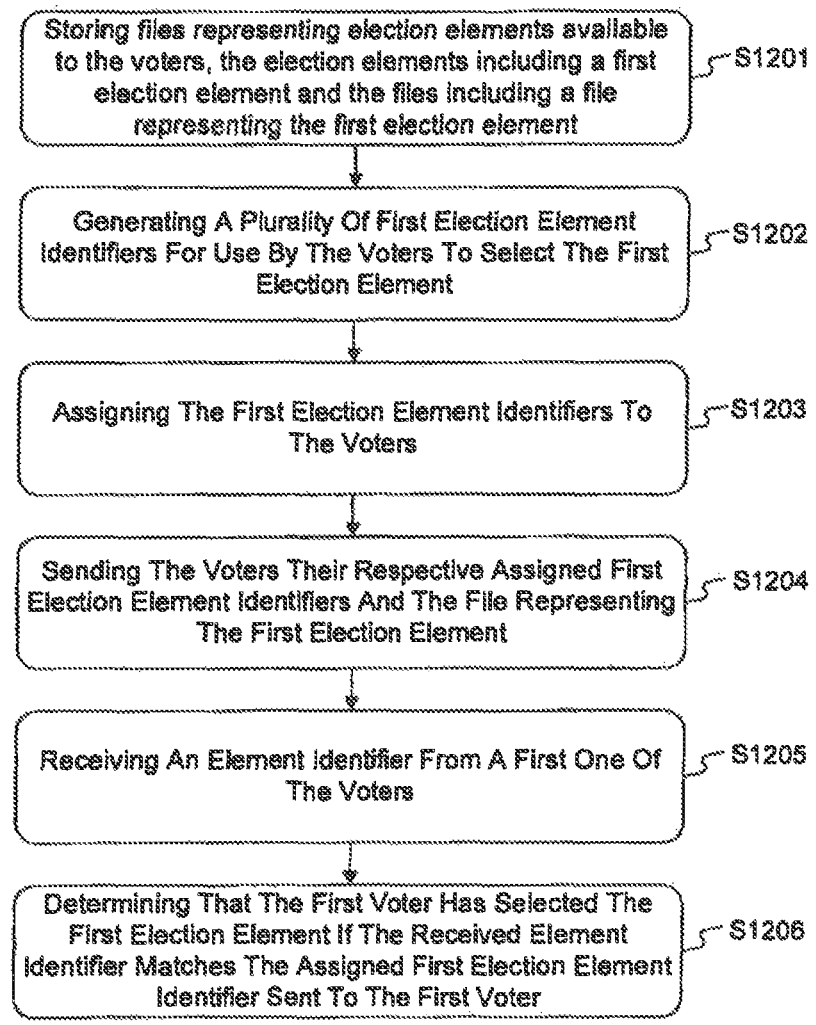
FIG. 12 is an exemplary flowchart for describing detailed steps in a method for obscuring selections of voters in an on-line election consistent with certain aspects related to the present invention.

FIG. 12 is an exemplary flowchart 1200 of a method consistent with the invention. FIG. 12 illustrates a method 1200 for obscuring selections of voters in an electronic election. The method may be implemented, for example, using election element identification media storing component 210, election identifier providing component 212, election identifier receiving component 213, and election identifier interpreting component 214 of application server 104.

Figure 13:
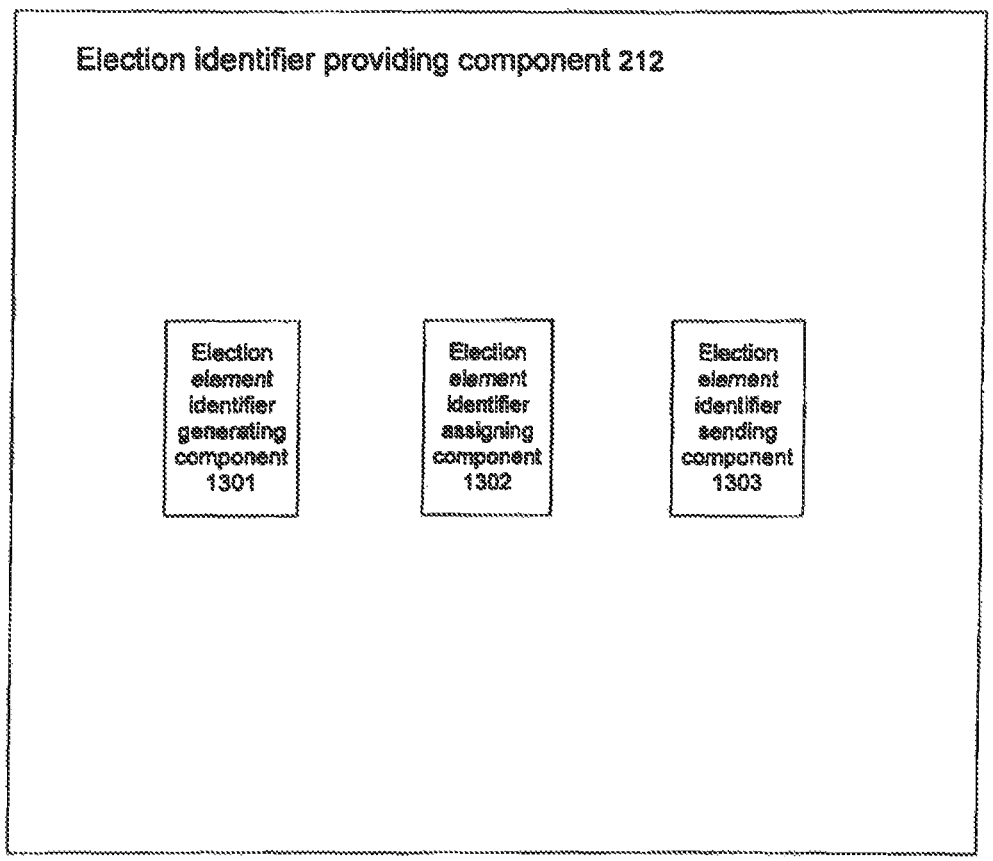
FIG. 13 is a block diagram of an exemplary election identifier providing component consistent with certain aspects of the present invention.

As shown in FIG. 13, election identifier providing component 212 may include election element identifier generating component 1301, election element identifier assigning component 1302, and election element identifier sending component 1303. These components may, in conjunction with election element identification media storing component 210 and election identifier interpreting component 214, implement method 1200.

At step S1201, election element identification media storing component 210 stores media files representing election elements available to the voters, the election elements including a first election element and the media files including a media file representing the first election element, as discussed below.

Election element identification media storing component 210 stores election element identification media such as candidate A photo 500A and candidate B photo 500B shown in FIG. 5, as discussed above. The stored election element identification media can each correspond to an election element, such as candidate A and candidate B, respectively. Also as shown in FIG. 5, election identification media storing component 210 store election element identifiers for the election itself and for individual races, such as Bigtown Election 2008 image 501 and Bigtown Mayor Race image 502.

At step S1202, election element identifier generating component 1301 generates a plurality of unique first election element identifiers for use by the voters to select election elements, as discussed below.

Election element identifier generating component 1301 can generate a number of different GUIDs. In one embodiment, the election element identifiers are GUIDs generated by a system call to a Windows™ operating system. Other embodiments may use identifiers other than GUIDs, such as UUIDs, random numbers, or any other numbers. In some embodiments the identifiers will be unique to the voters, but all that is required is that the identifier be sufficient for application server 104 to be able to correlate the identifier to a particular election element for a particular voter. Once election element identifier generating component 1301 generates the GUIDs, they can then be assigned to the voters, as discussed below.

At step S1203, election identifier assigning component 1303 assigns the election identifiers to the voters, as discussed below.

Election identifier assigning component 1303 may assign the generated GUIDs to each of the voters, to provide each voter with a unique identifier for referring to each election element. One example of this technique is discussed above with respect to FIG. 4, as reference table 233 may identify photos of the candidates along with other media with GUIDS unique to each voter. For example, as shown in FIG. 4, an election element BIGTOWN_ELECTION_2008 may be identified by a Bigtown_election_img file, stored in correspondence with GUID 401-1 6585 for the first voter at voting terminal 101-1, and stored in correspondence with GUID 401-2 1794 for the second voter at voting terminal 101-2. As another example, an election element BIGTOWN_MAYOR_RACE may be identified by a Bigtown_mayor_race_img file, stored in correspondence with GUID 403-1 1648 for the first voter, and stored in correspondence with GUID 403-2 1794 for the second voter.

At step S1204, election element identifier sending component 1303 sends the voters their respective assigned election element identifiers and the media file representing the first election element, as discussed below.

In one embodiment, the element identifiers (GUIDs) are sent separately from media files representing the election elements. Election element identifier sending component 1303 can do so by embedding the GUIDs into HTML ballots 600-1 and 600-2 as file names images referred to but not included in the HTML ballots. For example, while first HTML ballot 600-1 appears on voting terminal 101-1 as shown in FIG. 6A, the actual HTML source for first HTML ballot 600-1 may not include candidate A photo 500A, candidate B photo 500B, Bigtown Election 2008 image 501, or Bigtown Mayor Race image 502.

Instead, the HTML source may include references to these files that are only discernable by application server 104. For example, the HTML source may include an HTML element that displays an image, such as an image tag. In such embodiments, the HTML source for first HTML ballot 600-1 may include <img src="6585.jpg"/> as a reference to Bigtown Election 2008 image 501. Similarly, the HTML source for HTML ballot 600-1 can also include <img src="1648.jpg"/> as a reference to Bigtown_mayor_race_img 502, <img src="4572.jpg"/> as a reference to candidate A photo 501A, and <img src="7897.jpg"/> as a reference to candidate B photo 501B. In similar fashion, HTML source for HTML ballot 600-2 may include <img src="1794.jpg"/> as a reference to as a reference to Bigtown Election 2008 image 501, <img src="3590.jpg"/> as a reference to Bigtown_mayor_race_img 502, <img src="1024.jpg"/> as a reference to candidate A photo 501A, and <img src="5517.jpg"/> as a reference to candidate B photo 501B. Each reference specifies where in HTML ballots 600-1 and 600-2 to display the identified .jpg files. Note that, because using image tags and file extensions such as .jpg may serve to help an attacker identify file types, different HTML tags may used to identify image files, along with the extensions that do not identify the file as an image. This technique can further obscure the significance of communications across network 102.

At step S1205, electronic identifier receiving component 213 receives element identifiers from the voters, as discussed below.

Generally, voting terminals 101-1 and 101-2 will send electronic identifier receiving component 213 GUIDs corresponding to voter selections in order to inform application server 104 of the voters' choices in the election. In order to convey the correct GUID's to electronic identifier receiving component 213, voting terminals 101-1 and 101-2 can simply rely on the file names that include the GUIDs.

This can be accomplished as follows. When voting terminal 101-1 receives HTML ballot 600-1, web browser 201 on voting terminal 101-1 generates http requests to application server 104 for the files "6585.jpg," 1648.jpg," "4572.jpg," and "7897.jpg." Application server 104 can then refer to reference table 233 in order to determine which files are identified by the GUIDs 6585, 1648, 4572, and 7897 for the first voter at voting terminal 101-1 for voter ID 3518C. Application server 104 then sends the corresponding image files, i.e. Bigtown_election_img 502, Bigtown_mayor_face_img_503, candidate A photo 501A, and candidate B photo 501B.

As shown in FIG. 6A, voting terminal 101-1 displays the received image files in their respective locations within HTML ballot 600-1. The first voter can then select candidate A photo 500A, and web browser 201 can send GUID 4572 back to application server 104. In this manner, the first voter is able to identify their selection of candidate A to application server 104 in a secure manner. Even if an attacker has manipulated voting terminal 101-1 such as by storing a cascading style sheet file or a replacement image file on voting terminal 101-1, the attacker cannot cause HTML ballot 600-1 to be displayed improperly. This is because the attacker cannot know the file name beforehand, as the filename includes the generated GUID. Thus, as long as the first voter selects the correct image file for their chosen candidate, the first voter also selects the correct GUID.

Further, using this technique, even an attacker who defeats the SSL or TSL encryption over network 102 cannot discern the meaning of the GUIDs transmitted across the network without having some entity determine the meaning of candidate photo A. In most instances it will be difficult or at least time-consuming for a computer to perform the requisite processing to determine that candidate A photo corresponds to candidate A 500S, even if candidate A photo 500A includes identifying text. In some embodiments, media files such as candidate A photo 501A are rotated with different images representing the same concept, such as other photos of candidate A, or by making minor alterations to the file each time it is sent over network 102, such as by watermarking the file each time with a different watermark. In this manner, even if a human being determines that a particular file corresponds to candidate A, the file actually used for each voter to represent candidate A is different. This prevents an attacker from simply having a human identify candidate A photo 500A and candidate B photo 500B when sent to the first voter, and then identifying the files by calculating a hash of the files and using the hash to identify other instances of these files on network 102.

When voting terminals 101-1 and 101-2 send back their respective GUIDs, electronic identifier receiving component 213 receives the GUIDs for subsequent interpretation by election identifier interpreting component 214.

At step S1206, election identifier interpreting component 214 determines that the voters have selected election elements if the received element identifiers match the assigned element identifiers sent to the voters, as discussed below.

Election identifier interpreting component 214 interpret GUID 401-A1 received from the first voter at voting terminal 101-1 as a vote for candidate A, and GUID 401-B2 received from the voter at voting terminal 101-2 as a vote for candidate B. Election identifier interpreting component 214 does so by referring to reference table 233.

Obfuscation of Other Election Elements

In some embodiments, identifiers such as GUIDs are used to refer to election elements other than candidates, or indeed other than election choices. For example, each time a voter enters credentials, a new session ID can be created by application server 104. Internally, application server 104 will use the same session ID, for example by storing the session ID in reference table 233. However, application server 104 can use the technique discussed above so that the voting terminal will be reference a different session ID in each communication, e.g. the assigned GUID or other identifier. In this manner, an attacker cannot even discern that the same voter's session is being used in each communication between the voting terminal and application server 104.

In some embodiments, a voter session is in place before method 300 begins. For example, an initial session GUID may be generated before the first voter supplies credentials at step S301 of method 300. Application server 104 may use this initial session GUID to refer to the voter session for the first voter throughout method 300. In some embodiments, as method 300 proceeds, the initial session GUID is replaced, and successive GUIDs are generated by application server 104. Application server 104 and voting terminal 101-1 may refer to the first voter's session using the current GUID.

It is also possible to use identifiers such as GUIDs to represent, for example, text files. In some embodiments, text files can be used to represent candidates, e.g. by including the candidate's name in the text file. Such text files could be used in place of the media files in reference table 233. By assigning different GUIDs for the first voter and the second voter, different GUIDs can be used by the voters to use to refer to the same text file.

In some embodiments, each communication from central election site 108 to voting terminals 101-1 and 101-2 is obscured in this manner, e.g. by treating each file sent over network 102 as an election element, assigning a GUID to the file before sending the file over network 102, and referring to the file by the GUID. For example, JavaScript files and cascading style sheet (CSS) files can be referred to by GUID rather than by a conventional file name.

Assigning GUIDs to HTML Elements

In the embodiment disclosed above, the GUID used for the filenames of candidate A photo 501A and candidate B photo 501B was also used by voting terminals 101-1 and 101-2 to cast a vote. Thus, for example, selecting choice response element 601-1A caused voting terminal 101-1 to send the GUID for candidate A photo 501A back to application server 104.

However, it is possible to assign different GUIDs to media files and input elements such as choice response element 601-1A, and to name the input elements in the HTML code with the corresponding GUID. In such embodiments, the GUID for choice response element 601-1A, rather than the GUID for candidate A photo 500A, would be returned to application server 104 if the first voter chose candidate A.

Note that this introduces an additional layer of security. It is relatively obvious to a human viewer that, because of the disposition of choice response element 601-1A underneath candidate A photo 500A, this checkbox is used to vote for candidate A. However, it is not so obvious that this is the case to a computer that is not preprogrammed to understand the HTML ballot format.

Using this technique, an attacking computer that compromised the security of the SSL session on network 102 would see two related GUIDs sent on network 102 to voting terminal 101-1, e.g. the GUID for candidate A photo 500A and the GUID for checkbox 601-1A. When the first voter selects candidate A, only the GUID for checkbox 601-1A will be sent over network 102 back to application server 104. Therefore, because the attacking computer cannot comprehend the relationship between choice response element 601-1A and photo 500A, the attacking computer will not be able to tell that the GUID for choice response element 601-1A sent back to the application server is also related to candidate A photo 500A.

Note that this technique can be of particular benefit if text is used to represent a candidate, rather than or in addition to a media file such as photo 500A. An attacking computer would need to do some facial or voice recognition or other complex technique to discern the meaning of a media file, but can simply read text. Therefore, if application server 104 represents candidate A with text written as "Candidate A," it could be relatively easy for an attacker to understand that a corresponding GUID sent back to application server 104 would indicate a vote for candidate A. However, by using a GUID for a corresponding web page element such as choice response element 601-1A rather than an identifier associated with the text, it is much more difficult for an attacking computer to appreciate the significance of the communications on network 102.

Image Input Elements in an HTML Page

A refinement of the above approach is to use multiple images in place of an HTML input. For example, rather than an HTML checkbox, two images can be used for each checkbox—a picture of an unchecked box, and a picture of a checked box. Each image can have its own assigned GUID or other identifier, e.g. a GUID for an unchecked image of choice response element 601-1A and a GUID for a checked image of choice response element 601-1A. As in the other disclosed embodiments, application server 104 will store these GUIDs in reference table 233.

When HTML ballot 600-1 is first displayed, unchecked images of a vote box will be displayed for vote boxes 601-1A and 601-1B. When the first voter selects the image for choice response element 601-1A, a scripting language such as Javascript can be used to replace the unchecked image with the checked image of choice response element 601-1A. In this embodiment, two GUIDs would be used to represent choice response element 601-1A, and two GUIDs would be used to represent vote box 601-1B. The GUID for the checked image of choice response element 601-1A would be sent back to application server 104. In some embodiments, the GUID for the unchecked box of image 601-1B will also be sent back to application server 104.

When application server 104 receives these GUIDs, application server 104 can simply read reference table 233 to determine which GUID represents a checked vote box. In this case, application server 104 will be able to interpret the GUID for the image of checked choice response element 601-1A as a vote for candidate A. In this embodiment, an attacking computer would not only need to discern that checkbox 601-1A corresponds to candidate A image 500A, but would also need to appreciate the significance of the GUID for the checked image being used rather than the GUID for the unchecked image.

Refreshing GUIDs

In certain embodiments, election identifier interpreting component 214 may delete or otherwise invalidate GUIDs after a certain period of time elapses. Election identifier interpreting component 214 may also invalidate GUIDs each time a new web page is sent to a voting terminal. For example, if application server 104 sends a new web page to voting terminal 101-1, election identifier interpreting component 214 may invalidate any GUIDs assigned to the first voter at election identifier interpreting component 214.

In such embodiments, a new GUID can be generated at each time interval or for each new web page, and the new GUID can replace the existing GUID in table 233. Thus, each time a voter is presented with a web page for referring to a particular election element, the voter will be assigned a different GUID. For example, 4572 was assigned to the first voter when they were presented with HTML ballot 600-1, and 4572 was used as the file name for candidate A photo 501A. A new GUID, e.g. 2845, may be generated and replace 4572 in reference table 233 each time a web page is sent to voting terminal 101-2. Thus, for example, even though validation page 800-1 may include candidate A photo 501A, this time the file name will include the new GUID, e.g. "2845."

As a general proposition, by shortening the time each GUID is valid, the security of system 100 can be improved. For example, if GUID 4572 were used to refer to candidate A photo 501A in both HTML ballot 600-1 and validation page 800-1, it would at least be possible for an attacker to know that the same image is being referenced in the two communications. By changing the GLAD used to refer to candidate A photo 501, it is more difficult for an attacker to discern that the same file is being transmitted over network 102 in both files.

Additional refinements are possible. For example, an attacker might be able to compute a hash value for candidate A photo 501A each time the photo is sent over network 102. Even if the file name (e.g., GUID) used to reference the photo changes, the hacker may be able to tell that the same file has been sent over the network twice simply by determining that both photos hash to the same value.

Therefore, in some embodiments application server 104 will add entropy to files each time they are sent over network 102. In the case of a media file, the entropy can be added by altering virtually any characteristic of a media file, such as by adding a different watermark each time, or altering part of the file that does not affect viewing or playback of the file. In this manner, the media file will be recognizable to a human viewer at a voting terminal as the same picture even though the file itself has somewhat different data. This prevents an attacking computer from being able to tell that the two media files represent the same election element, while the human user at the voting terminal is easily able to understand the media file.

Entropy can also be added to data files. For example, if a the contains the words "Candidate A" to represent candidate A, characteristics can be altered to vary the file size without visually altering the representation. If characteristics are edited for the "Candidate A" file each time the file is sent over network 102, the file will result in different hash computations and thus will not appear to be identical from the perspective of an attacking computer. A human user will be unaware of the altered characteristics and read the text "Candidate A." In embodiments where text is used to represent a candidate or other election element, whitespace characters can be added to the text to alter the file size.

Stateless Application Server

By using the techniques discussed above, e.g. continually generating new GUIDs to refer to each election element, it is possible to reduce the amount of time a given GUID has any meaning to application server 104. In some embodiments, each time application server 104 generates a new GUID for an election element, the GUIDs are stored only on database server 105.

Because application server 104 is not required to maintain any persistent data about the correspondence of GUIDs to election elements, it is possible to make application server 104 "stateless." In other words, each time application server 104 conducts a step in the disclosed methods, the processing of application server 104 is independent of any state information stored on application 104. This can be beneficial if the various components of application server 104 need to pass some technical auditing to ensure they comply with security requirements in various jurisdictions.

Systems and Methods for Mitigating Session Hijacking and Man-in-the-Middle Attacks In the embodiments described above, application server 104 may generate one or more validation pages (e.g., validation pages 800-1 and 800-2 of FIGS. 8A and 8B) that enable the voter to approve one or more pending votes. In an embodiment, a "pending" vote may include a choice of a voter in a particular election expressed on an electronic ballot stored in a corresponding portion of database server 105, as described above in reference to steps S305 to S311 of FIG. 3. In such instances, the pending vote may await conformation and approval by the voter through a corresponding validation page, as described above in reference to step S310 of FIG. 3 and as further described below. For example, a voting terminal associated with the voter (e.g., voting terminal 101-1 of FIG. 1) may receive information corresponding to the generated validation page, and may render the received information for presentation to the voter.

In certain aspects, as described herein, the presented validation page may include textual information identifying the particular election and at least one of the pending votes, and further, an image corresponding to the at least one pending vote. The presented validation page may also include input elements (e.g., input elements 801-1 and 802-1 of FIG. 8A) that enable that the voter to validate the at least one pending vote. For instance, the voter may select "Confirm my vote" element 801-1 at voting terminal 101-1, and voting terminal 101-1 may transmit indication indicative of the voter's validation to application server 104 for processing, tabulation, and recordation, as described above in reference to FIG. 3.

Further, in some embodiments, the presented validation page may include an image of a unique trust token assigned to the voter by election site 108. In such instances, by determining that the presented trust token corresponds to an image of the trust token provided to the voter independently through a secure electronic channel (e.g., an SSL or TSL session over network 102 between voting terminal 101 and application server 104) or secure physical channel (e.g., by mail or in person delivery), the voter may be confident that election site 108 represents an authentic voting system, and not a "fake" system established by an attacker to steal voting credentials for later use.

The disclosed embodiments are, however, not limited such exemplary techniques for verifying an authenticity of election site 108, and additionally or alternatively, of the voter at voting terminal 101-1. In further embodiments, application server 104 may implement a challenge-and-response process that enables the voter to determine whether communications between election site 108 and voting terminal 101-1 have been hijacked by an attacker. Furthermore, the challenge-and-response processes described below enable application server 104 to determine whether the voter associated with voting terminal 101-1 represents an "actual" voter or an attacker that has stolen the voter's authentication credentials and fraudulently accessed election site 108. In such instances, the challenge-and-response processes described below may also reduce the effectiveness of both "session hijacking" attacks and "man-in-the-middle" attacks, and further, and may reduce an ability of an attacker to trick an authentic voter into visiting a counterfeit voting site.

For example, in a session hijacking attack, a potential attacker may wait until the voter logs into election site 108 through voting terminal 101-1, and may attempt to intercept a token used to maintain session state between the voter's browser (e.g., web browser 201 of FIG. 2A) and a web server associated with election site 108 (e.g., web server 103 of FIG. 1). By way of example, tokens used to maintain state may include, but are not limited to, cookies, HTTP query string variables and specialized HTTP POST variables.

The attacker may initiate the session hijacking attack by establishing communications with web server 103 using the intercepted token and continuing the voting session in place of the authenticated voter. In such instances, the attacker usurps the voter's session with web server 103, and if the voter attempts to make a request to web server 103, web server 103 may deny the request as being stale due to the attacker's prior consumption of the session using the intercepted token.

Furthermore, through a session hijacking attack, the attacker may continue the usurped voting session to a point where voting terminal 101-1 receives and presents a corresponding validation page to the voter. In such instances, the attacker may hijack the session once the voter approves the pending votes, and provide a fraudulent confirmation page to the voter indicating that the election site 108 has received, recorded, and tabulated the pending votes indicated on the voter's pending electronic ballot. The attacker, however, does not transmit the approved ballot to election site 108, but instead modifies the approved ballot to generate a "pirated" ballot, which may be transmitted to election site 108 for processing and tabulation.

Additionally or alternatively, in a man-in-the-middle attack, the attacker inserts a program (e.g., malware) between browser 201 of voting terminal 101-1 and election site 108. In some instances, the infiltrated malware acts as a proxy between the voter and the election site 108, passing requests and responses between the two without any modification so interaction appears to be normal to both sides.

The malware may, however, capture at least a portion of the information flowing between the voting terminal 101-1 and election site 108. For example, the malware may capture the credentials used by the voter to log on to the election suite 108. Further, in certain aspects, the malware may allow the voter to execute the voting session up to the point where voting terminal 101-1 receives the corresponding validation page and the voter confirms the choices set forth on the pending ballot (e.g., an electronic ballot stored in a portion of database server 105, as described above in reference to steps S305 to S311 of FIG. 3). In these instances, the malware may intervene and present a fraudulent confirmation page to the voter indicating that election site 108 successfully processed and tabulated the pending ballot, but not actually transmit information identify the approved ballot to election site 108. The attacker may sell the stolen credentials to a third party, and additionally or alternatively, may modify the approved ballot according to the whim of the attacker.

In another instance, a man-in-the-middle attack may modify the pending ballot such that a vote is recorded as being cast for "Candidate A" when the voter actually selected "Candidate B." The infiltrated malware may intercept the validation page generated by application server 104 before presentation to the user at voting terminal 101-1, and may modify the validation page to falsely indicate that the voter selected "Candidate B," while the hijacked ballot (and recorded vote) actually shows the selection of "Candidate A."

In certain embodiments, election site 108 may leverage additional authentication information provided to the voter through a secure physical or electronic channel to reduce the effectiveness of session hijacking and man-in-the-middle attacks. For example, the additional authentication information may include a validation challenge and a corresponding validation response, and an administrator of election site 108 may provide the additional authentication information to the voter using a secure physical channel (e.g., by mail or by courier) or a secure electronic channel (e.g., an SSL or TSL session over network 102 between voting terminal 101 and application server 104).

In certain aspects, the additional authentication information, the voter's authentication credentials, and additionally or alternatively, information identifying the voter's trust token may transmitted from election site 108 to the voter in a single physical or electronic communication. In other embodiments, the additional authentication credentials may be transmitted to the voter in an electronic or physical communication separate from the authentication credentials and/or the trust tokens. Furthermore, the additional authentication information may be transmitted to the voter using a mode of communication different from that used to transmit at least one of the voter's authentication credentials or the trust tokens (e.g., the administrator may provide the voter with the additional authentication information by mail, and may transmit the information identify the trust tokens and the authentication credentials by secure electronic communications).

The validation challenge and validation response may include corresponding strings of alphanumeric characters. In such instances, application server 104 may generate the alphanumeric character strings, may associate the generated alphanumeric character strings with the voter, and may store the generated alphanumeric character strings in a corresponding portion of a database server. For example, reference table access component 209 on application server 104 (FIG. 2) may store the generated alphanumeric character strings within reference table 233 of database server 105.

For example, the generated validation challenge may be "BG7Y," and the generated validation response may be "995R." The disclosed embodiments are not limited to such exemplary validation challenges and responses, and in additional embodiments, the generated validation challenges and responses may include alphanumeric character strings of any length and/or composition appropriate to application server 104 and voting terminal 101-1. Further, in certain aspects, the generated pair of alphanumeric character strings may represent a validation challenge-response token, which may be provided to the voter through one or more of a secure physical channel or a secure electronic channel, as described above.

In an embodiment, application server 104 may incorporate the validation challenge associated with the voter within a corresponding portion of the voter's validation page (e.g., validation pages 800-1 of FIG. 8A) in order to mitigate an effectiveness of a potential session hijacking or man-in-the-middle attack. As described above, application server 104 may transmit information associated with the generated validation page to voting terminal 101-1, which may render the received information and present the generated validation page to the voter. In such instances, the presented validation page may include information identifying the validation challenge associated with the user, and may include information instructing the voter to enter the validation response that corresponds to the presented validation challenge. For example, the presented validation page may identify the validation challenge as 'BG7Y," and the user may consult the additional authentication credentials provided to the voter by the administrator of election site 108 and enter the corresponding validation response "995R" into voting terminal 101-1.

Upon confirmation of the votes identified within the presented validation page (e.g., by clicking on "Confirm my vote" input element 801-1 of validation page 801), voting terminal 101-1 may transmit information over network 102 indicating to application server 104 that the votes have been confirmed, and further, providing the validation response input by the voter. In some embodiments, application server 104 may receive the transmitted information from voting terminal 101-1, and may determine whether the received challenge response corresponds to the presented validation challenge. For example, application server 104 may access database server 105 to obtain the validation challenge and response information associated with the voter, and may compare the received validation response to the obtained validation response.

If the received validation response corresponds to the obtained validation response, application server 104 may process and record the confirmed voting information, as described above in reference to step S311 of FIG. 3. Alternatively, if application server 104 were to determine a lack of correspondence between the received and obtained validation responses, application server 104 may discard the received voting information, and as described herein, may require the voter to provide and additional set of authentication credentials.

Because the administrator of election site 108 provides the validation challenge and response to the voter through secure electronic or physical channels, the voter may be confident that presented validation page corresponds to an electronic communication between voting terminal 101-1 and an authentic election site (and not a "fake" site established by an attacker to steal voting credentials for later use). As described above, however, the voter may indicate multiple, sequential selections in an online election, and application server 104 may generate multiple validation pages corresponding to the sequential selections and transmit these multiple validation pages to voting terminal 101-1 for presentation to the voter. In such instances, application server 104 may incorporate a unique validation challenge within each of the validation pages to provide assurance that the voter is communicating with authentic election site 108 at each step of the election process.

In some embodiments, application server 104 may generate additional authentication information that includes alphanumeric character strings that corresponding to pairs of validation challenges and responses. As described above, the administrator of election site 108 may provide the additional authentication information to the voter using a secure physical channel (e.g., by mail or by courier) or a secure electronic channel (e.g., an SSL or TSL session over network 102 between voting terminal 101 and application server 104). Furthermore, the additional authentication information may inform the voter that each validation page includes a corresponding one of the validation challenges, and if the presented validation page includes a value absent from the provided validation challenges, or no value at all, the voter may determine that the a "fake" election site provided the presented validation page.

In certain aspects, application server 104 may access database server 105 and select a first one of the validation challenges associated with the voter in a corresponding portion of a first validation page. In an embodiment, application server 104 may select the first validation challenge from the plurality of stored validation challenges in a random manner. As described above, application server 104 may transmit information associated with the first validation page to voting terminal 101-1, which may render the received information and present the first validation page to the voter. In such instances, the presented first validation page may include information identifying the first validation challenge associated with the user, and may include information instructing the voter to enter the validation response that corresponds to the first validation challenge.

To confirm the one or more votes identified within the first validation page, the voter may enter the validation response corresponding to the first validation challenge, and may click on or otherwise activate a corresponding input element of the first validation page (e.g., "Confirm my vote" input element 801-1 of validation page 801). Upon confirmation by the voter, voting terminal 101-1 may transmit information over network 102 indicating the voter's confirmation and providing the validation response input by the user.

As described above, application server 104 may receive the transmitted information from voting terminal 101-1, and may determine whether the received challenge response corresponds to the first validation challenge. For example, application server 104 may access database server 105 to obtain a first validation response corresponding to the first validation challenge, and may the received validation response to the first validation response. If the received validation response corresponds to the first validation response, application server may process and tabulate the confirmed voting information, as described above in reference to step S311 of FIG. 3.

If, however, application server 104 were to determine that the received validation response fails to correspond to the first validation response, application server 14 may discard the received voting information, and as described herein, may require the voter to provide an additional set of authentication credentials. Further, in such instances, application server 104 may select a different one of the validation challenges associated with the voter for inclusion in a subsequent validation page for presentation to the voter.

As described above, the challenge and response processes implemented by application server 104 may reduce the effectiveness of session hijacking and man-in-the-middle attacks. For example, an attacker may steal the log-in credentials of the voter, intercept the validation challenge presented to the voter in the validation page, and further, intercept the validation response so that the vote is not recorded by the voting system. When the attacker later tries to use the stolen credentials to make their own vote, the attacker may be challenged on the validation page with a validation challenge different from that intercepted by the attacker. In such instances, the attacker will not know the corresponding validation response, because this information has never been entered into the web browser by the voter. Thus, application server 104 may block the attempted attack, because the attacker cannot provide the correct validation response needed for application server 104 to accept a false vote provided by the attacker.

In additional embodiments, when generating the validation page for the voter, application server 104 may generate a graphical object (e.g., a JPEG image, a bitmap image file, a Graphics Interchange Format (GIF) file, or a Portable Network Graphics (PNG) file) that includes content enabling the voter to confirm one or more pending votes in the particular election and an image of an alphanumeric character string that corresponds to a validation challenge. For example, the validation challenge may be "G773," and an administrator of election site 1008 may provide information identifying the validation challenge to the voter sing a secure electronic or physical channel, as described above. In addition to the voted ballot data and the validation challenge assigned to the voter, application server 104 may also incorporate one or more short, randomly selected alphanumeric character strings having a length similar to the validation challenge into the generated graphical object. For example, these additional alphanumeric character strings may be disposed at various positions within the generated graphical object (and thus, the validation page), and the validation challenge may be disposed randomly about the additional alphanumeric character strings within the generated graphical object.

In some embodiments, the validation challenge and some or all the additional alphanumeric character strings may be associated with corresponding "clickable areas" of the generated graphical object. Further, application server 104 may assign a one-time unique identifier to the validation challenge and each of the additional alphanumeric character strings, and thus, to the each of the clickable areas associated with the validation challenge and the additional alphanumeric character strings. For example, the assigned identifiers may include, but are not limited to, GUIDs compliant with the Universally Unique Identifier (UUID) standard described above. In some instances, application server 104 may store information identifying the validation challenge assigned to the voter within a portion of database server 105, along with the unique identifier assigned to the clickable area within the graphical object associated with the validation challenge (e.g., reference table access component 209 on application server 104 may store the information within reference table 233 of database server 105).

Further, for example, some or all of the graphical objects generated by application server 104 may incorporate slight random variations in size, color, font, and position of its constituent elements. In such instances, even if two generated graphical objects include the exact same visual content, these graphical objects would not be associated with identical binary files.

In an embodiment, the information identifying the validation challenge to the voter may instruct the voter to look for the identified validation challenge value within the corresponding validation image presented by voting terminal 101-1. If the voter fails to identify the validation challenge within the graphical object on the validation page, then the voter may be confident that the validation page is counterfeit and has been generated by an attacker. If, however, the voter identified the validation challenge within the graphical object (e.g., validation challenge "G773"), the voter may approve the pending ballot and the pending votes by clicking on or otherwise activating the region of the graphical object that includes the validation challenge "G773."

Voting terminal 101-1 may detect the voter's selection of the clickable area corresponding to the validation challenge, and voting terminal 101-1 may transmit information identifying the one-time unique identifier corresponding to the clickable area to application server 104 across network 102. Application server 104 may process the received information to obtain the unique identifier associated with the clickable area selected by the voter. Application server 104 may also access reference table 233 of database server 105 to obtain the validation challenge assigned to the voter, and further, the unique identifier assigned to the clickable area associated with the validation challenge.

In such instances, application server 104 may determine whether the received identifier corresponds to the obtain identifier, and as such, whether the voter selected the clickable area associated with the validation challenge. If application server 104 determines that the received identifier corresponds to the obtained identifier and that the voter selected the clickable area associated with the validation challenge, application server 104 may process the voting information confirmed by the voter and record the votes, as described above in reference to step S311 of FIG. 3.

If, however, application server 104 determines that the voter did not select the clickable area associated with the validation challenge, application server 104 may discard the received voting information, and as described above in reference to FIG. 3, may require the voter to provide an additional set of authentication credentials. Further, in an instance when application server 104 fails to record the voting information, application server 104 may assign new unique identifiers to the validation challenge and the additional alphanumeric character stings when generating a subsequent validation page, and may dispose the validation challenge and the additional alphanumeric character stings in different and random locations within a subsequent graphical object.

The disclosed embodiments are not limited to additional authentication information that includes a single validation challenge, and in further embodiments, application server 104 may assign a plurality of potential validation challenges to the voter. The plurality of validation challenges may represent unique alphanumeric character strings, and an administrator of election site 108 may provide additional authentication information identifying the potential validation challenges to the voter using a secure electronic or physical communication channel, as described above. Further, in such instances, application server 104 may store the potential validation challenges and information linking the potential validation challenges to the voter within a portion of database server 105 (e.g., reference table access component 209 on application server 104 may store the information within reference table 233 of database server 105).

As described above, when generating a validation page for the voter, application server 104 may generate a graphical object that includes content enabling the voter to confirm one or more pending votes in the particular election, an image of an alphanumeric character string that corresponds to one of the potential validation challenges, and images of short, randomly selected alphanumeric character strings having a length similar to the potential validation challenge. As described above, the generated graphical object may include, but is not limited to, a JPEG image, a bitmap image file, a Graphics Interchange Format (GIF) file, or a Portable Network Graphics (PNG) file.

In certain aspects, application server 104 may randomly select one of the potential random validation challenges for inclusion within the generated graphical object. Further, application server 104 may assign a one-time unique identifier to the potential validation challenge and the additional alphanumeric character strings, and thus, to the clickable areas associated with the selected potential validation challenge and the additional alphanumeric character strings. Application server 104 may transmit information associated with the generated validation page and graphical object to voting terminal 101-1 for rendering and presentation to the voter.

As described above, voting terminal 101-1 may present the validation page and the generated graphical object to the voter. If the voter fails to identify the validation challenge within the graphical object on the validation page, then the voter may be confident that the validation page is counterfeit and has been generated by an attacker. If, however, the voter identified the validation challenge within the graphical object, the vote may approve the ballot and the pending votes by clicking on or otherwise activating the region of the graphical object that includes the validation challenge. Voting terminal 101-1 may detect the voter's selection of the clickable area corresponding to the validation challenge, and voting terminal 101-1 may transmit information identifying the identifier corresponding to the clickable area to application server 104 across network 102.

Application server 104 may process the received information to obtain the identifier associated with the clickable area selected by the voter, and may access reference 233 of database server 105 to obtain the validation challenge assigned to the voter, and further, the identifier assigned to the clickable area associated with the validation challenge. If application server 104 determines that the received identifier corresponds to the obtained identifier and that the voter selected the clickable area associated with the validation challenge, application server 104 may process the voting information confirmed by the voter and record the votes, as described above in reference to step S311 of FIG. 3.

If, however, application server 104 determines that the voter did not select the clickable area associated with the validation challenge, application server 104 may discard the received voting information, and as described above in reference to FIG. 3, may require the voter to provide an additional set of authentication credentials. Further, in an instance when application server 104 fails to record the voting information, application server 104 may select a different one of the potential validation challenges assigned to the voter for inclusion in a subsequent validation page, as described above. In such instances, application server 104 may assign new unique identifiers to the different validation challenge and the additional alphanumeric character stings when generating the subsequent validation page, and may dispose the validation challenge and the additional alphanumeric character stings in different and random locations within a subsequent graphical object.

In the embodiments described above, the generation of a graphical object that includes an image of a validation challenge may further reduce the effectiveness of session hijacking and man-in-the-middle attacks, as it may be more difficult for an attacker to recover the alphanumeric validation challenge from the graphical object. Furthermore, even if the attacker could intercept and stop a message from the voter approving the pending votes, and could subsequently determine the alphanumeric validation challenge included within the graphical object, the alphanumeric validation challenge will not be incorporated into subsequent graphical objects. If the attacker attempts to use the stolen credential or hijacked session to make a false vote, election site 108 may block the attack because the attacker will not have captured a validation challenge incorporated within a subsequent graphical object.

In further embodiments, application server 104 may generate validation pages that require a voter to click on a region of a graphical object corresponding to a validation challenge and enter a corresponding validation response into the validation page to approve one or more pending votes. For example, as described above, an administrator of election site 108 may provide the voter with the alphanumeric validation challenge and response using a secure electronic or physical communication channel.

In certain aspects, application server 104 may generate a graphical object that includes an image of the alphanumeric validation challenge and images of one or more randomly selected alphanumeric character strings. Upon presentation of the validation page by voting terminal 101-1, the voter may approve the one or more pending votes by clicking on or otherwise activating a "clickable area" of the graphical object corresponding the validation challenge, and further, by entering the alphanumeric validation response corresponding to the displayed validation challenge. In such instances, voting terminal 101-1 may transmit information identifying the clickable region selected by the voter and the validation response entered by the voter to application server 104. Application server 104 may process the voting information approved by the voter and tabulate the approved votes when the voter selected the clickable region of the graphical object corresponding to the validation challenge assigned to the voter, and further, when the voter entered the correct validation response.

In additional embodiments, application server 104 may generate a graphical object for inclusion in a validation page based on a random selection of one of a plurality of pairs of alphanumeric validation challenges and responses assigned to the voter. For example, as described above, an administrator of election site 108 may provide to the voter, using secured electronic or physical communications channels, additional authentication information that identifies the alphanumeric character strings corresponding to the assigned pairs of validation challenges and responses. In such instances, application server 104 may randomly select one of the assigned pairs of validation challenges and responses, and as described above, may generate a graphical object that includes an image of the selected alphanumeric validation challenge and images of one or more randomly selected alphanumeric character strings. Upon presentation of the validation page by voting terminal 101-1, the voter may approve the one or more pending votes by clicking on or otherwise activating a "clickable area" of the graphical object corresponding the validation challenge, and further, by entering the alphanumeric validation response corresponding to the displayed challenge, as described above.

In such instances, voting terminal 101-1 may transmit information identifying the clickable region selected by the voter and the validation response entered by the voter to application server 104. Application server 104 may process the voting information approved by the voter and record the approved votes when the voter selected the clickable region of the graphical object corresponding to the validation challenge assigned to the voter, and further, when the voter entered the correct validation response. Further, in an instance when application server 104 fails to record the voting information, application server 104 may randomly select a different pair of the assigned validation challenges and responses, and generate a subsequent graphical object and validation page based on the selected validation challenge and response.

Using the embodiments described above, election site 108 may implement textual and graphical challenge and response techniques that reduce the effectiveness of both "session hijacking" attacks and "man-in-the-middle" attacks, and further, and may reduce an ability of an attacker to trick an authentic voter into visiting a counterfeit voting site. In certain aspects, however, an attacker may intercept a message from voting terminal 101-1 indicating the voter's approval of one or more pending ballots, and provide the provide the voter with a "false" confirmation page indicating the recordation of the pending votes at election site 108. In such instances, the vote has not been corrupted, but the attack may disenfranchise the voter without the voter's knowledge. Further, using social engineering techniques, an attacker may target a specific group of voters to disenfranchise them and thus change the results for an election.

In an embodiment, election site 108 may reduce the effectiveness of such targeted attacks by sharing a "ballot acceptance verification token" with the voter, and by incorporating the shared ballot acceptance verification token into a final message confirming the acceptance of the pending votes by election site 108. For example, an administrator of election site 108 may provide the ballot acceptance verification token to the voter using one of the secure electronic or physical communication channels described above. In certain aspects, application server 104 may randomly generate an alphanumeric character string corresponding to the ballot acceptance verification token. Further, the ballot acceptance verification token may be provided to the voter in a corresponding electronic or physical communication separate from those communications providing the voter with authentication credentials, trust tokens, or validation challenge and response pairs. Alternatively, the administrator of election site 108 may provide the voter with any combination of the authentication credentials, the trust tokens, the validation challenge and response pairs, and/or the ballot acceptance verification token in a single electronic or physical communication.

In certain aspects, and upon recordation of one or more pending votes associated with the voter, application server 104 may generate a final confirmation page that indicates an acceptance of the pending votes by election site 108 and includes the generated ballot acceptance verification token. Application server 104 may transmit information associated with the final confirmation page to voting terminal 101-1, which may render and present the final confirmation page to the voter. For example, the voter may receive information from the administrator of election site 108 that identifies the ballot acceptance verification token as "06887 5198." If the final confirmation mage presented to the voter at voting terminal 101-1 fails to include the token "06887 5198," the voter may be confident that the final confirmation page is counterfeit and that the voting session has been attacked. In such instances, the voter may alert the election authorities to the likely attack.

The disclosed embodiments are not limited to final confirmation pages presented by voting terminal 101-1, and in additional embodiments, election site 108 may provide a separate web site to allow the voter to confirm the acceptance of the pending votes by election site 108. In such instances, the voter may access the web site and enter the previously received authentication credential used by the voter to access election site 1008 and participate in the online election. The accessed web site may indicate whether election site 108 accepted the pending votes, and if so, the website may provide the ballot acceptance verification token to the voter. If the ballot acceptance verification token provided by the web site does not correspond to the token received by the voter in the secure communication (e.g., token "06887 5198"), or alternatively, if the web site fails to provide any ballot acceptance verification token, the voter may be confident that voting session has been attacked and the pending votes have not been counted or recorded by election site 108.

Further, in additional embodiments, the administrator of election site 108 may provide the voter with a numbered set of unique ballot acceptance verification tokens by secure electronic or physical communication channels. In such instances, if the final confirmation page or the web site provided by election site 108 may prompt the user to enter one of the numbered unique ballot acceptance verification tokens to confirm the acceptance of the votes by election site 108. For example, the final confirmation page or the web site may prompt the user to enter a specific one of the numbered unique ballot acceptance verification tokens (e.g., the third token in the sequence), or the voter may be free to enter any of the numbered unique ballot acceptance verification tokens. In such instances, application server 104 may confirm the validity of the ballot acceptance verification tokens provided by the user, and may transmit information confirming the acceptance of the pending votes for display in either the final confirmation page or the web site.

In additional embodiments, the web site may provide a voter with an option to request presentation of one of the unique numbered ballot acceptance verification tokens. For example, the web site may prompt the voter to enter an indicia of a desired one of the ballot acceptance verification tokens within a corresponding input region (e.g., the voter may enter "3" to view the third token in the sequence), or alternatively, the voter may select the indicia of the desired one of the ballot acceptance verification tokens from a menu displayed on the web site (e.g., the user may select the number "3" from a pull-down menu to view the third token in the sequence). Application server 104 may receive information identifying the indicia of the desired token from the web site, may obtain the desired token from database server 105, and may transmit the desired token to the web site for presentation to the voter. If the displayed token fails to match the token provided to the voter through the secured electronic or physical communication channel, the voter may be confident that voting session has been attacked and the pending votes have not been counted or recorded by election site 108. If, however, the displayed token corresponds to the token provided to the voter, the voter may be confident that the pending votes have been counted and recorded by election site 108.

The embodiments described above may reduce the effectiveness of attacks that attempt to disenfranchise specific groups of voter in order to affect an outcome of an election. Because the ballot acceptance verification token is known only to the voter and to election site 108, an attacker cannot know this value during the voting session in order to counterfeit the final confirmation page or the web site. Although a man-in-the-middle attacker may intercept the ballot acceptance verification token once displayed by the final confirmation page or web site, the man-in-the-middle attacker will be unable to fraudulently influence the election because application server provides the ballot acceptance verification token to the voter only after accepting and recording the pending votes.

Conclusion

Each of the components discussed above comprising the various servers in central election site 108, as well as voting terminals 101-1 and 101-2, may be implemented as hardware, software, or a combination thereof. In some embodiments, the various components are software code stored on computer-readable media used to provide computer-readable instructions for performing methods consistent with the invention. The various servers and voting terminals may comprise processors that execute the computer-readable instructions. In other embodiments, FPGA's, ASICs, or other programmable logic devices can be used to implement the components. For example, an FPGA or ASIC can be beneficially used by application server 104 to perform computationally intensive operations such as the encryption, decryption, and hashing functions described above.

Embodiments consistent with the invention can also be implemented in a variety of different architectures. The disclosed embodiments discuss various processes as being implemented on the architecture of FIG. 1. However, those skilled in the art will understand that embodiments of the invention are susceptible to implementation on virtually any networked computer architecture. Further, embodiments may be devised that combine the functionality of the various computers in a manner different from that in the disclosed architecture. Functionality for any one of the disclosed computers can be distributed across several different computers, such as by implementing one or more of the various components of application server 104 on separate computers. Functionality disclosed herein as occurring on separate computers can be combined to occur on a single computer, such as by combining database server 105 and/or web server 103 into application server 104.

Thus, the processes disclosed herein are not inherently related to any particular computer, network, architecture, environment, or other apparatus, and may be implemented by a suitable combination of hardware, software, and/or firmware. Various general-purpose machines may be used with programs written in accordance with teachings of the invention, or it may be more convenient to construct a specialized apparatus or system to perform the required methods and techniques.

The systems and methods disclosed herein may be implemented as a computer program product, that is, a computer program tangibly embodied in an information carrier. Such an information carrier may be embodied in a machine-readable storage device, for execution by, or to control the operation of, data processing apparatus, e.g., a programmable processor, a computer, or multiple computers. A computer program can be written in any appropriate form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

VII. APPENDIX

Summary of Systems and Methods for Mitigating Session Hijacking and Man-in-the Middle Attacks In the disclosed embodiments, a voter can verify that he is communication over the Internet to the authentic voting system, and not to a fake system that might only exist to steal the voting credentials for later use. Additional disclosed embodiments provide a technique for the voter to be sure that as the voting session proceeds through its various stages the session has not been hijacked, and that he remains connected to the authentic voting system. It also may assure the voting system that the actual voter is on the other end of the transaction and not an attacker that has stolen the credentials. This technique may mitigate the effectiveness of the 'session hijacking' attack and the 'man in the middle' attack. It also may mitigate the effectiveness of tricking the voter into visiting a counterfeit voting site.

In session hijacking the attacker may wait until the voter logs on and may then intercept the token being used to maintain session state between the voter's browser and the web server (examples of tokens used to maintain state are cookies, HTTP query string variables and specialized HTTP POST variables). The attacker may use the stolen token to immediately make a request to the web server so that the attacker is now the one in session with the web server, and can continue the voting session in place of the actual voter. The voter's session has been usurped by the attacker, and if the voter attempts to make a request to the web server it will be denied for being stale—the attacker consumed the session first. Using this method, the attacker could follow a voting session up to the point where the voter has seen the validation page for his vote and approves it. The attacker hijacks the session at this point, writes a page back to the voter indicating that the ballot has been stored, but does not send the transaction on to the voting system. The attacker then uses the hijacked session to modify the ballot and complete the now pirated vote.

In the man-in-the-middle attack, the attacker may infiltrate a program ("malware") between the voter's browser and the voting system. This malware acts as a proxy between the voter and the voting system, passing requests and responses between the two without any modification so interaction appears to be normal to both sides. The malware is however capturing all the information flowing between the two. In this way the malware may capture the credentials used by the voter to log on to the voting system. The malware may allow the voter to execute the voting session up to the point where the voted ballot is confirmed. Here the malware may step in and display a page to the voter saying that the vote has been successfully recorded, but not send the confirmation message to the voting system so that the vote is not recorded in the voting system. These stolen credentials may then be sold to a third party or used to vote the voter's ballot according to the whim of the attacker. Another attack would be to modify the voted ballot so that the vote is made for Candidate A when the voter actually selected Candidate B. The malware might modify the verification page from the voting system so that it appeared that Candidate B had been selected.

The disclosed embodiments may leverage additional information sent from the voting system administrator to the voter via 'secure means', probably the postal mail. This information might be sent along with the credentials or a separate communication. There a few variations of how this would work:

Validation Challenge/Response Token

The voter may be sent a pair of alphanumeric values via secure means—the 'validation challenge' and the 'validation response'. For example the validation challenge might be 'BG7Y' and the validation response '995R'. The voting system may display the validation challenge 'BG7Y' on the validation page. Because the validation challenge has only been communicated to the voter out-of-band, he now has confidence that he is still talking with the authentic voting site because only the voting site and the voter know this value. In order to approve the vote the voter must enter the validation challenge value of '995R'. If the voting system does not receive this value it will not approve the vote.

Multiple Validation Challenge/Response Token Pairs

This is similar except that multiple pairs of values may be provided to the voter. When the voting system displays the validation page it also displays one of the validation challenge values for that voter, chosen at random. The voter may be told to expect one of those values and knows that the site is not authentic if a different value, or no value, is displayed. In order to approve and record the vote the voter must enter the validation response value that corresponds to the displayed validation challenge. If the vote is not approved and stored in the voting system then the next time the validation page is displayed for that voter a different validation value from the set provided to the voter may be displayed, requiring the corresponding validation response value in order to approve the vote.

This technique may mitigate the stolen credential (enabled by the man-in-the-middle) and session hijacking attacks. The attacker can steal the credentials used to log in and can steal the validation challenge/response pair provided by the voter and can intercept the validation response so that the vote is not recorded by the voting system. When the attacker later tries to use the stolen credentials to make their own vote they will be challenged on the validation page with a different validation challenge value for that voter. The attacker will not know the corresponding validation response value because this information has never been entered into the web browser by the voter. Thus the false vote will not be accepted by the voting system because the correct validation response value cannot be provided.

Graphical Validation Challenge

Here the voter may be sent a validation challenge value via the secure means, for example 'G773'. When the voting system builds the validation page, it may build the data to be displayed into a graphical object such as a JPEG. In addition to the voted ballot data the image may include several short alphanumeric random values of the same length as the validation challenge value. One of these values is the actual validation challenge string 'G773' for this voter, which may be randomly placed amongst the other values. These random values may be placed into their own 'clickable area' on the image. Each of these clickable areas is associated with a onetime unique identifier (this is our GUID technique from the patent).

Each image built by the voting system may incorporate slight random variations in size, color, font and position of its elements such that even if two images included the exact same visual content they would not be identical binary files.

The voter may be instructed to look for the provided validation challenge value in the validation image. If he does not see it then he knows that the validation page is counterfeit. In order to approve the ballot the voter may click on the clickable area containing the validation challenge 'G773'. This causes the one-time unique id corresponding to that clickable area, and other information, to be sent to the voting system. Only if the voting system receives the unique id corresponding to the correct validation challenge will it record the vote. If the vote is not recorded and the validation page is later displayed again by the voting system, the validation challenge text may be placed in a different random location and a new set of unique ids may be assigned. This provides a similar mitigation as before only now the text is embedded into a larger graphical object. It may be much harder for an attacker to recover the value of the validation challenge from an image Multiple Graphical Validation Challenge Values Here the voter may be sent a set of potential challenge values via the secure means instead of just one value. When the voting system builds the validation image it may randomly select one of the set of validation challenge values for this voter to build into the validation image. The voter may be told to expect to see one of the possible values on the validation image. If he does not see one of the values on the list he knows that the site is counterfeit. If the validation page is displayed more than one time a different validation challenge value may be chosen to be built into the validation image. This may provide further mitigation against the attacks described above. Even if the attacker can intercept and stop the final vote approval message, and can subsequently determine the value of the validation challenge used on the validation image, that value will not be used again. If the attacker attempts to use the stolen credential or hijacked session to make a false vote they will not have been able to capture the value of the next required validation challenge value on the next validation image.

Graphical Validation Challenge Plus Response

Here the voter may be sent a pair of validation challenge and response values by secure means. The validation challenge may be built into the validation image as described above in 'Graphical Validation Challenge'. In order to approve the vote the voter may provide the correct validation response value as well as clicking on the correct validation challenge clickable area in the image.

Multiple Graphical Validation Challenge Plus Response Pairs

Here the voter may be sent multiple pairs of validation challenge and response values by secure means. The validation challenge may be selected at random by the voting system and built into the validation image as described above in 'Multiple graphical validation challenge values'. In order to approve the vote the voter may enter the correct validation response value that corresponds with the validation challenge value displayed in the validation image, and may also click on the correct validation challenge clickable area in the image. Should the vote not be approved by the voter, the next time the voting system is requested to create the validation image for the same voter it may randomly select a different validation challenge/response pair.

Final Confirmation Pages and Ballot Acceptance Verification Tokens

The embodiments described so far may address the continued integrity of the voting process and how the voter and the voting system can gain assurance that they are talking to each other without a third party interfering or corrupting the process. For example, an attacker may intercept the voting process between the voter and the voting system, may send the voter a false page stating that the vote was accepted, but not send the final vote acceptance transaction to the voting system so that the voter's vote is not stored in the voting system. The vote has not been corrupted, but the voter has been denied his vote and may be unaware of this. Using social engineering techniques to target such an attack at a specific group of voters to disenfranchise them may change the results for an election.

In another embodiment, the voter may be sent additional information out-of-band to be used as a 'ballot acceptance verification token'. This may be a randomly generated numeric or alphanumeric string which is displayed on the voting system's final page which reports to the voter that the vote has been accepted. For example the voter may be instructed in the offline communication that the token '06887 5198' must be displayed on the final vote confirmation page. If the page does not contain this token he should alert the election authorities because it is likely that the voting session was attacked, and that a counterfeit vote confirmation page has been displayed. Because the token is only known to the voter and the voting system an attacker cannot know this value during the voting session in order to counterfeit the vote confirmation page. An attacker such as the man in the middle can read this token's value once the vote confirmation page is displayed, but by then it is too late—the voting system will only display the token once the voter's ballot has been accepted and stored in the voting system.

Another Embodiment the voting system may provide a separate web site to allow voters to confirm their vote has been recorded in the voting system. The voters may log on with the voting credentials previously used to log on to the voting site. The system may report if the vote has been recorded or not. If the vote has been recorded, the ballot acceptance verification token may be displayed by the system. The voter may verify that the token matches the value sent in the offline communication.

Another Embodiment as above but the voter may be sent a numbered set of unique ballot acceptance verification tokens. If the vote has been accepted, the system may prompt the voter to enter the sequence number of one of the set of ballot acceptance verification token sent in the offline communication. The voter may choose one of the sequence numbers e.g. '3', may enter it and the system may display the token corresponding to that sequence number.

What is claimed is:

1. A computer-implemented method, comprising the method comprising the following operations performed by at least one processor:
obtaining information identifying one or more pending votes associated with a voter and an online election;
identifying a validation challenge assigned to the voter, the validation challenge comprising a first alphanumeric character string associated with the voter;
generating a validation page for the voter, the validation page identifying at least one of the one or more pending votes and the validation challenge;
generating an electronic instruction to transmit the validation page to a voter device associated with the voter;
receiving a response to the validation page from the voter device;
determining whether the received response corresponds to the validation challenge assigned to the voter; and
recording the pending votes, when the received response corresponds to the validation challenge.

2. The computer-implemented method of claim 1, wherein the response comprises a second alphanumeric string different from the first alphanumeric character string, and the pair of the first and second alphanumeric strings represent a challenge-response token.

3. The computer-implemented method of claim 1, wherein determining comprises querying at least one database to obtain validation response information associated with the voter, and comparing the received response to the obtained validation response information.

4. The computer-implemented method of claim 3, further comprising discarding the pending votes and requesting an additional set of authentication credentials when the at least one processor detects a lack of correspondence between the received response and the obtained validation response information.

5. The computer-implemented method of claim 1, wherein the validation page further comprises a graphical object, and a selectable region of the graphical object corresponds to the validation challenge.

6. The computer-implemented method of claim 5, wherein the at least one processor records the pending votes after the voter selects the selectable region corresponding to the validation challenge.

7. A non-transitory computer-readable medium storing instructions which, when executed, cause at least one computer processor to perform the following operations:
obtaining information identifying one or more pending votes associated with a voter and an online election;
identifying a validation challenge assigned to the voter, the validation challenge comprising a first alphanumeric character string associated with the voter;
generating a validation page for the voter, the validation page identifying at least one of the one or more pending votes and the validation challenge;
generating an electronic instruction to transmit the validation page to a voter device associated with the voter;
receiving a response to the validation page from the voter device;
determining whether the received response corresponds to the validation challenge assigned to the voter; and
recording the pending votes, when the received response corresponds to the validation challenge.

8. The non-transitory computer-readable medium of claim 7, wherein the response comprises a second alphanumeric string different from the first alphanumeric character string, and the pair of the first and second alphanumeric strings represent a challenge-response token.

9. The non-transitory computer-readable medium of claim 7, wherein determining comprises querying at least one database to obtain validation response information associated with the voter, and comparing the received response to the obtained validation response information.

10. The computer-implemented method of claim 9, further comprising discarding the pending votes and requesting an additional set of authentication credentials when the at least one processor detects a lack of correspondence between the received response and the obtained validation response information.

11. The non-transitory computer-readable medium of claim 7, wherein the validation page further comprises a graphical object, and a selectable region of the graphical object corresponds to the validation challenge.

12. The non-transitory computer-readable medium of claim 11, wherein the at least one processor records the pending votes after the voter selects the selectable region corresponding to the validation challenge.

13. A computerized system, comprising:
a memory storing computer-executable instructions;
a processor configure to execute the stored instructions to perform operations including:
obtaining information identifying one or more pending votes associated with a voter and an online election;
identifying a validation challenge assigned to the voter, the validation challenge comprising a first alphanumeric character string associated with the voter;
generating a validation page for the voter, the validation page identifying at least one of the one or more pending votes and the validation challenge;
generating an electronic instruction to transmit the validation page to a voter device associated with the voter;
receiving a response to the validation page from the voter device;
determining whether the received response corresponds to the validation challenge assigned to the voter; and recording the pending votes, when the received response corresponds to the validation challenge.

14. The computerized system of claim 13, wherein the response comprises a second alphanumeric string different from the first alphanumeric character string, and the pair of the first and second alphanumeric strings represent a challenge-response token.

15. The computerized system of claim 13, wherein determining comprises querying at least one database to obtain validation response information associated with the voter, and comparing the received response to the obtained validation response information.

16. The computerized system of claim 15, wherein the operations further include discarding the pending votes and requesting an additional set of authentication credentials when the at least one processor detects a lack of correspondence between the received response and the obtained validation response information.

17. The computerized system of claim 13, wherein the validation page further comprises a graphical object, and a selectable region of the graphical object corresponds to the validation challenge.

18. The computerized system of claim 17, wherein the at least one processor records the pending votes after the voter selects the selectable region corresponding to the validation challenge.

* * * * *